United States Patent
Shannon

(10) Patent No.: US 10,713,516 B2
(45) Date of Patent: *Jul. 14, 2020

(54) SYSTEM AND METHOD TO ENABLE THE APPLICATION OF OPTICAL TRACKING TECHNIQUES FOR GENERATING DYNAMIC QUANTITIES OF INTEREST WITH ALIAS PROTECTION

(71) Applicant: United Launch Alliance, L.L.C., Centennial, CO (US)

(72) Inventor: Ryan Lee Shannon, Castle Rock, CO (US)

(73) Assignee: United Launch Alliance, L.L.C., Centennial, CO (US)

( * ) Notice: Subject to any disclaimer, the term of this patent is extended or adjusted under 35 U.S.C. 154(b) by 244 days.

This patent is subject to a terminal disclaimer.

(21) Appl. No.: 15/853,272

(22) Filed: Dec. 22, 2017

(65) Prior Publication Data

US 2018/0137347 A1 May 17, 2018

Related U.S. Application Data

(63) Continuation of application No. 14/809,563, filed on Jul. 27, 2015, now Pat. No. 9,852,330.

(51) Int. Cl.
*G06K 9/20* (2006.01)
*G06T 7/00* (2017.01)
(Continued)

(52) U.S. Cl.
CPC ......... *G06K 9/209* (2013.01); *G06K 9/00523* (2013.01); *G06K 9/3233* (2013.01);
(Continued)

(58) Field of Classification Search
CPC ...... G06K 9/00335; G06K 9/28; G06K 9/209; G06K 2209/40; G06K 2209/27; H04N 5/247

See application file for complete search history.

(56) References Cited

U.S. PATENT DOCUMENTS 9,497,380 B1 * 11/2016 Jannard .............. H04N 5/23238
2007/0165208 A1 * 7/2007 Cowburn .............. G03G 21/046
356/71

OTHER PUBLICATIONS

Lall et al. "High Speed Digital Image Correlation for Transient-Shock Reliability of Electronics", IEEE, 2007 Electronic Components and Technology Conference, pp. 924-939. (Year: 2007).*

* cited by examiner

*Primary Examiner* — Siamak Harandi
(74) *Attorney, Agent, or Firm* — Sheridan Ross P.C.

(57) ABSTRACT

Systems and methods for realizing practical applications of high speed digital image correlation (DIC) for dynamic quantities of interest are provided. In particular, a series of images are captured for a component of interest in which a non-filtered sensor and an analog low-pass filtered sensor are included within the region of interest for the series of images. Displacement signals are obtained for the component of interest, the non-filtered sensor, and the analog low-pass filtered sensor by applying digital image correlation processing to the series of images, which may also be wavelet filtered. Dynamic quantities of interest may be generated and derived from the displacement signals after having been wavelet filtered. Such dynamic quantities of interest based on the wavelet filtered DIC-derived displacement signal may be compared to sensor-derived dynamic quantities of interest to determine if aliasing is or is likely to be present.

17 Claims, 14 Drawing Sheets

(51) Int. Cl.
*G06K 9/46* (2006.01)
*G06K 9/32* (2006.01)
*G06K 9/62* (2006.01)
*G06K 9/00* (2006.01)

(52) U.S. Cl.
CPC ......... *G06K 9/4614* (2013.01); *G06K 9/6215* (2013.01); *G06T 7/001* (2013.01); *G06K 2209/401* (2013.01); *G06T 2207/10016* (2013.01); *G06T 2207/20064* (2013.01)

SYSTEM AND METHOD TO ENABLE THE APPLICATION OF OPTICAL TRACKING TECHNIQUES FOR GENERATING DYNAMIC QUANTITIES OF INTEREST WITH ALIAS PROTECTION

CROSS-REFERENCE TO RELATED APPLICATIONS

This application is a continuation of U.S. patent application Ser. No. 14/809,563, filed Jul. 27, 2015, the entire disclosure of which is hereby incorporated herein by reference for all that it teaches and for all purposes.

FIELD OF THE DISCLOSURE

The disclosure relates to a system and method for realizing practical applications of high speed digital image correlation for dynamic quantities of interest, where dynamic quantities of interest may include Shock Response Spectrum (SRS), Pseudo Velocity Shock Response Spectrum, velocity/acceleration time history, and harmonic wavelet map, for example.

BACKGROUND

Digital image correlation (DIC) is a non-contact measurement technique that uses high-resolution machine-vision digital cameras to accurately measure surface deformation in two or three dimensions. The field of high speed DIC, in addition to other methods of optical tracking, is advancing due to improvements in optical sensor sensitivity, image processing, and computer processor speed. However, even taking into account such advancements, improvements with respect to filtering, analysis, and use of data derived from DIC techniques are needed to avoid invalid conclusions and recommendations based on erroneously captured and filtered data.

SUMMARY

Theoretical measurement of DIC-derived dynamic quantities of interest, such as Shock Response Spectrum (SRS), Pseudo Velocity Shock Response Spectrum, velocity/acceleration time history, harmonic wavelet map, etc., include a DIC-based calculation requiring temporal differentiation. However, reliable DIC-derived dynamic quantities of interest are impractical for a variety of reasons including, but not limited to, the difficulty associated with differentiating real DIC displacement signals in order to obtain dynamic quantities of interest as well as the inability to guard against temporal aliasing due to the finite exposure limitations of digital image acquisition systems. That is, comparative approaches to temporal aliasing of DIC data products involve oversampling, random sampling, and implementing digital low-pass filtering techniques. Such an approach has been demonstrated, however, to have practical limitations due in part to the frequency-rich signals often encountered and the Analog/Digital conversion limitations that make it impossible to digitally filter data after the aliased sample has been taken. Further evidence of the need for temporal analog anti-aliasing filters is practically demonstrated by the fact that modern Data Acquisition Systems (DAS) come equipped with analog anti-aliasing low-pass filters to guard against the temporal aliasing phenomena. However, no known low-pass temporal optical analog anti-aliasing filter exists that can be used to protect DIC from aliasing.

Further, when differentiating DIC signals, such as displacement information generated from DIC techniques, to obtain dynamic quantities of interest, errors due in part to noise or uncertainly are severely amplified. Accordingly, computing temporal derivatives from raw data using the central difference method for example, amplifies errors due to noise or uncertainly at each differentiation step making the dynamic quantities of interest unreliable. Therefore, comparative approaches using DIC-derived data products that require temporal numerical differentiations typically use Fourier filtering techniques that assume period signals. However, periodicity tends to be a poor assumption for most high speed DIC applications because of the inherent non-periodic nature of phenomena that merit DIC application in the first place. Further still, high speed camera memory limits also contribute to impractical Fourier filtering applicability. Similarly, comparative approaches using DIC-derived data products tend to overemphasize the qualitative aspects of software calculated derivatives providing limited quantitative use. Therefore, ignorance of the aliasing phenomena in addition to the use of periodic filtering techniques and an overreliance on software calculated derivatives may lead to invalid conclusions and recommendations based on corrupt data.

In accordance with aspects of the present disclosure, a system for generating dynamic quantities of interest with alias protection based on digital image optical tracking techniques is provided. More specifically, embodiments of the present disclosure address temporal aliasing and differentiating of high speed DIC data for dynamic quantities of interest (Shock Response Spectrum (SRS), Pseudo Velocity Shock Response Spectrum, velocity/acceleration time history, harmonic wavelet map, custom, etc.) by introducing two sensors, such as accelerometers, into the Region of Interest (ROI) of a DIC system. That is, the ROI of a DIC system includes a first sensor that is analog low-pass filtered and a second sensor that is not analog low-pass filtered, where the sensor that is not analog low-pass filtered is also referred to herein as a non-filtered sensor. Additionally, instead of applying Fourier filters to DIC displacement signals, embodiments of the present disclosure utilize one or more wavelet de-noising filters, together with an appropriate wavelet decomposition level, to filter optically displacement signals. Accordingly, the DIC displacement signal may be differentiated and used to calculate a dynamic quantity of interest at both sensor locations. The resulting optically-derived dynamic quantity of interest at each sensor location may then be compared to the associated sensor-derived calculation of the dynamic quantity of interest. In addition, the wavelet filter type and level combination may be determined based on a similarity algorithm, such as Sum of Absolute Differences (SAD), Sum of Squared Differences (SSD), etc. Such a similarity algorithm may be specified by a user or may be the result of an algorithm determination process. In accordance with embodiments of the present disclosure, temporal high speed DIC anti-aliasing protection is achieved by comparing the two collocated sensors for aliasing and/or determining whether the optically-derived dynamic quantity of interest best resembles the filtered or unfiltered dynamic quantity of interest measure.

In accordance with embodiments of the present disclosure, a system is provided, the system including at least one camera focused on a region of interest, a sensor located within the region of interest, and a data processing system adapted to receive sensor data from the sensor and a series of images, each image including the region of interest, from the at least one camera. In embodiments, the data processing system includes at least one processor and memory storing one or more program instructions that when executed by the at least one processor, execute the steps of: generating an optically-derived dynamic quantity of interest for the sensor based on the series of images provided from the at least one camera, generating a dynamic quantity of interest based on sensor data provided from the sensor, comparing the optically-derived dynamic quantity of interest for the sensor to the dynamic quantity of interest based on sensor data provided from the sensor, and generating an indication of aliasing based on a measure of similarity between the optically-derived dynamic quantity of interest for the sensor and the dynamic quantity of interest based on sensor data provided from the sensor.

In accordance with another embodiment of the present disclosure, a method is provided, the method comprising: generating a first dynamic quantity of interest for a sensor based on a series of images provided from at least one camera directed at a region of interest; generating a second dynamic quantity of interest based on sensor data provided from the sensor; comparing the first dynamic quantity of interest to the second dynamic quantity of interest; and generating an indication of aliasing based on a measure of similarity between the first dynamic quantity of interest and the second dynamic quantity of interest.

Further still, in accordance with embodiments of the present disclosure, a system is provided, the system including at least one camera focused on a region of interest, a first sensor, a second sensor, and a data processing system adapted to receive sensor data and the series of images, wherein the sensor data is from the first sensor and the second sensor and each image includes the region of interest. In embodiments, the data processing system includes at least one processor and memory storing one or more program instructions that when executed by the at least one processor, execute the steps of: determining a first dynamic quantity of interest for the first sensor based on a displacement signal derived from the series of images via a digital image correlation technique, wherein the displacement signal is wavelet filtered according to at least one of a wavelet filter type and a wavelet decomposition level, determining a second dynamic quantity of interest for the second sensor based on a displacement signal derived from the series of images via the digital image correlation technique, wherein the displacement signal is wavelet-filtered according to at least one of a wavelet filter type and a wavelet decomposition level, determining a third dynamic quantity of interest for the first sensor based on analog low-pass filtered sensor data provided by the first sensor, determining a fourth dynamic quantity of interest for the second sensor based on non-filtered sensor data provided by the second sensor, comparing the first dynamic quantity of interest to the third dynamic quantity of interest, comparing the second dynamic quantity of interest to the fourth dynamic quantity of interest, generating an indication of aliasing based on one or more of a measure of similarity between the first dynamic quantity of interest and the third dynamic quantity of interest and a measure of similarity between the second dynamic quantity of interest and the fourth dynamic quantity of interest, and determining a fifth dynamic quantity of interest for a component of interest based on a wavelet-filtered displacement signal derived from the series of images via the digital image correlation technique.

BRIEF DESCRIPTION OF THE DRAWINGS

Exemplary embodiments of the present disclosure are described in conjunction with the appended figures wherein.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
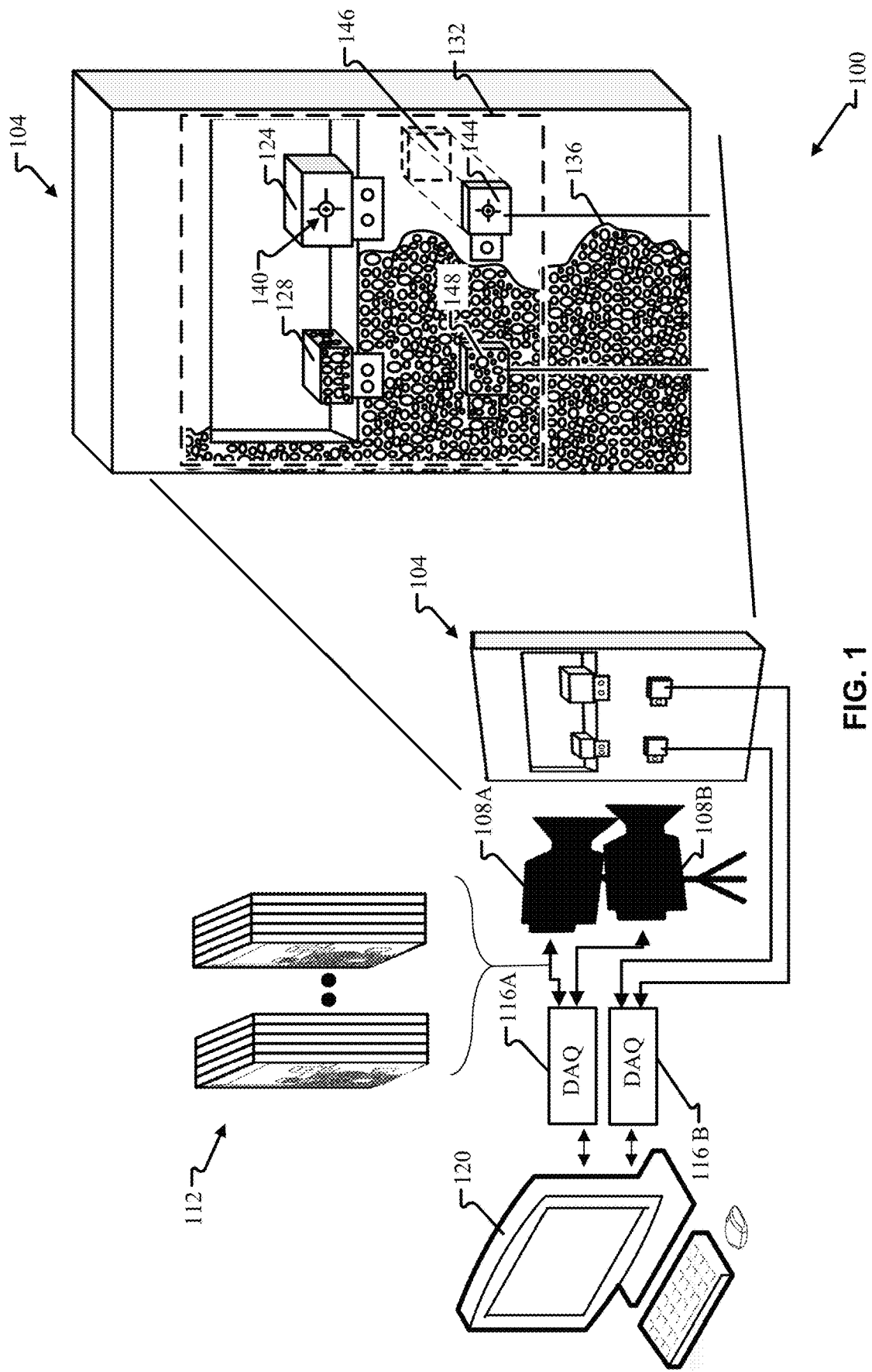
FIG. 1 depicts a system for realizing practical applications of high speed DIC for dynamic quantities of interest with alias protection in accordance with at least some embodiments of the present disclosure.

Referring initially to FIG. 1, details of a system 100 for realizing the practical applications of high speed DIC for dynamic quantities of interest with alias protection are depicted in accordance with at least some embodiments of the present disclosure. The system 100 generally includes a test fixture 104, one or more cameras 108A-B that obtain a series of images 112 at a desired frame rate, at least one data acquisition system 116A-B, and at least one data processing system 120. Sensor data, such as acceleration data, may be obtained from at least two sensors located within the field of view of the one or more cameras 108A-B. Further, the series of images 112 captured by the one or more cameras 108A-B may be used to derive displacement, velocity, and acceleration data for components within the field of view of the cameras 108A-B, and more specifically, within the region of interest 132. The data provided by the sensors may be used in combination with the optically-derived displacement, velocity, acceleration, and/or other measures for one or more components within the field of view of the one or more cameras 108A-B to determine the presence, or lack of, aliasing.

The test fixture 104 illustrated in FIG. 1 may be one of many test fixtures utilized in accordance with embodiments of the present disclosure. That is, although specific details of the test fixture 104 are provided herein, such details should not be considered limiting as other test fixtures, equipment, and techniques exist for realizing one or more applications of high speed DIC for generating dynamic quantities of interest. As one example, test fixtures capable of supporting dropping mass, air gun, and/or explosive excitations are contemplated. Further, test fixtures capable of supporting one or more vibration analyses are contemplated as well.

With further reference to FIG. 1, the test fixture 104 may include at least one component of interest 124, at least one excitation device 128, at least one non-filtered sensor 144, and at least one analog low-pass filtered sensor 148. In accordance with embodiments of the present disclosure, the systems and methods disclosed herein are particularly applicable to shock and vibration testing of components within the aerospace industry, geophysical drilling industry, and any other areas where shock and vibration, and, more particularly, shock and/or vibration of a non-periodic nature, is present. Due in part to camera memory limitations and a corresponding rate of acquiring images, techniques described herein may be equally applicable to periodic signals for the same or similar reasons as non-periodic signals because the periodic signal does not have time to complete multiple cycles.

The component of interest 124, also referred to as an object under test, may generally include any object undergoing testing for which dynamic quantities of interest are of concern. Examples of the component of interest 124 include, but are not limited to, printed circuit boards (PCBs) and other electronic components, aerospace components, such as a clamp band opening device, and geophysical drilling components, such as drill bits, rotary steerable systems, drill collars, and drillpipe. In some instances, the component of interest 124 may be the region of interest 132. As one non-limiting example, and in accordance with embodiments of the present disclosure, dynamic quantities of interest related to wave propagation of a plate may be of interest. In such instances, the component of interest 124 would be the same as the region of interest 132.

The excitation source device 128 may include, but is not limited to, explosive, air gun, mass drops, impact drops, and other means of achieving a desired shock and/or vibration. An explosive excitation source device, such as a pyroshock, also known as pyrotechnic shock, generally includes contact and non-contact explosions, where a contact explosion may occur on the same test fixture 104 on which the component of interest 124 is mounted, and a non-contact explosion may occur on a different test fixture from which the component of interest 124 is mounted. The magnitude and shape of the resulting pyroshock may generally be controlled by using a specified test fixture 104, modifying the test fixture 104, utilizing a contact or non-contact explosion, altering the location and size of the explosive charge, altering how the explosive charge and/or the component of interest 124 are mounted to the test fixture 104, and altering the location of the component of interest 124 in relation to the test fixture and/or the explosive excitation source device 128. With respect to mass drops, also known as a dropping mass, a mass of any shape and size may be dropped from a given height and may impact the test fixture 104 directly or a plate or other device/piece attached to the test fixture 104. Similar to the explosive excitation source device 128, the magnitude and shape of the resulting shock may generally be controlled by using a specified test fixture 104, modifying the test fixture 104, changing a direction of impact, altering the location and means for mounting the component of interest 124, and altering properties/characteristics of the mass, such as, but not limited to, the hitting tip material, shape, and size, the weight of the mass, and the height at which the mass is dropped. Further, the location and/or area of impact may also be altered to achieve a desired shock of a specified magnitude.

Similar to the dropping mass, a shock generated from an air gun usually results from an object, such as a missile, being fired from the air gun and impacting a specified location on or attached to the test fixture 104. To control the magnitude and shape of the resulting shock, the test fixture 104 may be modified or chosen specifically for a specified shock, the impact location and material may be altered, the impact direction may be altered, and/or the characteristics/parameters of the missile, such as, but not limited to, weight, material, and speed, may be altered. Although the explosive, air gun, and dropping mass were discussed in detail as pertaining to the excitation source device 128, embodiments of the present disclosure are applicable to various other excitation source devices 128 and combinations thereof.

In accordance with embodiments of the present disclosure, the test fixture 104 includes one or more non-filtered sensors 144 and one or more analog low-pass filtered sensors 148 that provide sensor data resulting from the excitation source device 128, the component of interest 124, and/or the testing environment to a data acquisition system 116A-B. Each of the sensors 144 and 148 may be selected according to a desired sensitivity, measurement range, frequency range, and resonant frequency. The non-filtered sensor 144 is utilized to obtain raw sensor data resulting from excitation source device 128, the component of interest 124, and/or the testing environment. Such raw sensor data is not subjected to an anti-aliasing filter, also referred to as an analog low-pass filter, and is utilized in accordance with embodiments of the present disclosure to provide aliasing protection for optically-derived dynamic quantities of interest.

The analog low-pass filtered sensor 148 is utilized to obtain filtered acceleration data resulting from excitation source device 128, the component of interest 124, and/or the testing environment. The cutoff frequency of a filter for the analog low-pass filtered sensor 148 may be selected and/or may be adjusted based on a predetermined and/or selected criteria in conjunction with the data acquisition system 116A-B in order to prevent aliasing issues arising from high-amplitude and high-frequency sources of energy, such as those sources modeled by shock and pyrotechnic shock pulses. When analog anti-aliasing filters, such as a low-pass filter having a specified cutoff frequency, are not utilized, high frequency shock energy may be "folded down" about the Nyquist frequency thereby artificially increasing the apparent shock energy or level at a lower frequency, which may lead to invalid conclusions and recommendations based on such misleading data. Accordingly, the data acquisition system 116A-B as a whole, including the analog low-pass filtered sensor 148, but excluding the non-analog low-pass filtered sensor 144, are configured to minimize the effects of aliasing and ensure that the digitized data resulting from the analog-to-digital converter of the data acquisition system 116A-B is correct. Such an analog low-pass filter may be included in the analog low-pass filtered sensor 148, as part of a signal conditioner component within or outside of the data acquisition system 116A-B, and/or combinations thereof.

In accordance with embodiments of the present disclosure, the cutoff frequency of the analog low-pass filtered sensor 148 may be selected to satisfy Shannon's Sample Theorem, which states that a sampled time signal must not contain components at frequencies above the Nyquist frequency. The Nyquist frequency is one-half of the sampling frequency, where the minimum sampling frequency is chosen to be at least twice the maximum frequency component of a source signal in order to satisfy the Nyquist Sampling Theorem. Therefore, in order to reduce and/or eliminate components at frequencies above the Nyquist frequency, the cutoff frequency of the analog low-pass filtered sensor 148 is generally set at, or slightly above, the maximum analysis frequency.

However, in configuring and testing various components of interest 124, a maximum analysis frequency may be unknown. That is, when considering stage separation and other examples from the launch vehicle industry, shock events impacting a drill collar occurring during a drilling operation, and/or other applications involving non-periodic and non-repeatable shock-type events, the maximum expected frequency from the source of the shock energy is essentially unknown; accordingly, the sampling rate may be set to an exceedingly high value in order to capture such high frequency signal components. Thus, the cutoff frequency of the low-pass filter for the analog low-pass filtered sensor 148 may be set at or slightly above one-half of the exceedingly high sampling rate value. Alternatively, or in addition, the maximum analysis frequency and/or the sampling rate may be configured in accordance with industry guidelines. That is, industry guidelines suggest that the sampling rate be at least ten times greater than the maximum analysis frequency. Accordingly, the cutoff frequency of the low-pass filter for the analog low-pass filtered sensor 148 may be set to one-tenth of the sampling rate. Of course, it should be understood that the cutoff rate of the analog low-pass filter may impact the configuration of the cutoff frequency; accordingly, the cutoff rate of the low-pass filter should be considered when configuring or specifying a cutoff frequency.

In accordance with embodiments of the present disclosure, the one or more cameras 108A-B acquire a series of images 112 at a desired frame rate and provide the series of images 112 to a data acquisition system 116A-B. The data acquisition system 116A-B may be part of an overall data acquisition system, may be one or more separate standalone data acquisition systems, or may be combinations thereof. For example, the data acquisition system 116B may include one or more high speed video acquisition cards specifically configured to obtain a series of images 112 at a specified frame rate, or sampling rate, and resolution. As previously discussed, the sample rate may be configured based on an overall data acquisition system configuration and may be determined based on an expected maximum analysis frequency. However, when a maximum analysis frequency is unknown, the frame rate may be set to an exceedingly high value in accordance with the capabilities and limitations of the data acquisition system 116B and the data processing system 120. Accordingly, as the series of images 112 are not subjected to temporal aliasing protection at the time of acquisition, the data acquired from and/or derived based on the series of images 112 may be misleading due in part to the effects of aliasing.

Thus, in accordance with embodiments of the present disclosure, a comparison can be made between the data acquired from the non-filtered sensor 144 and the analog low-pass filtered sensor 148 to determine if aliasing at the non-analog low-pass filtered sensor 144 is contributing to or otherwise causing erroneous results in the data from the analog low-pass filtered sensor 148 and/or the DIC-derived quantities of interest based on the series of images 112. As will be discussed below, such a comparison may be based on an agreement, similarity, and/or correlation between the data acquired from two sources. For example, if an SRS plot of data acquired from the non-filtered sensor 144, such as a non-filtered accelerometer, and the analog low-pass filtered sensor 148, such as an analog low-pass filtered accelerometer, demonstrates that the non-filtered sensor 144 deviates from or is unreasonably higher than the data acquired from the analog low-pass filtered sensor 148, aliasing may be the reason for the discrepancy. Further, if the correlation or agreement between an SRS plot of data acquired from the non-filtered sensor 144 and the analog low-pass filtered sensor 148 is above or below a predetermined or selected threshold, aliasing may be the reason for the deviation. Therefore, if aliasing is detected based on a comparison between the data acquired from the non-filtered sensor 144 and the analog low-pass filtered sensor 148, aliasing may also exist or otherwise influence data acquired from the series of images 112. That is, if aliasing is detected based on a comparison between the data acquired from the non-filtered sensor 144 and the analog low-pass filtered sensor 148, aliasing may also exist or otherwise influence DIC-derived quantities of interest, such as displacement, velocity, and acceleration data, based on the series of images 112 acquired from the one or more cameras 108A-B. In such instances, additional filtering techniques may be applied to the data acquired from and/or derived based on the series of images 112 to remove effects due to aliasing. Alternatively, or in addition, such data acquired from and/or derived from the one or more cameras 108A-B may be tagged, or otherwise identified, and excluded from further consideration.

Figure 5:
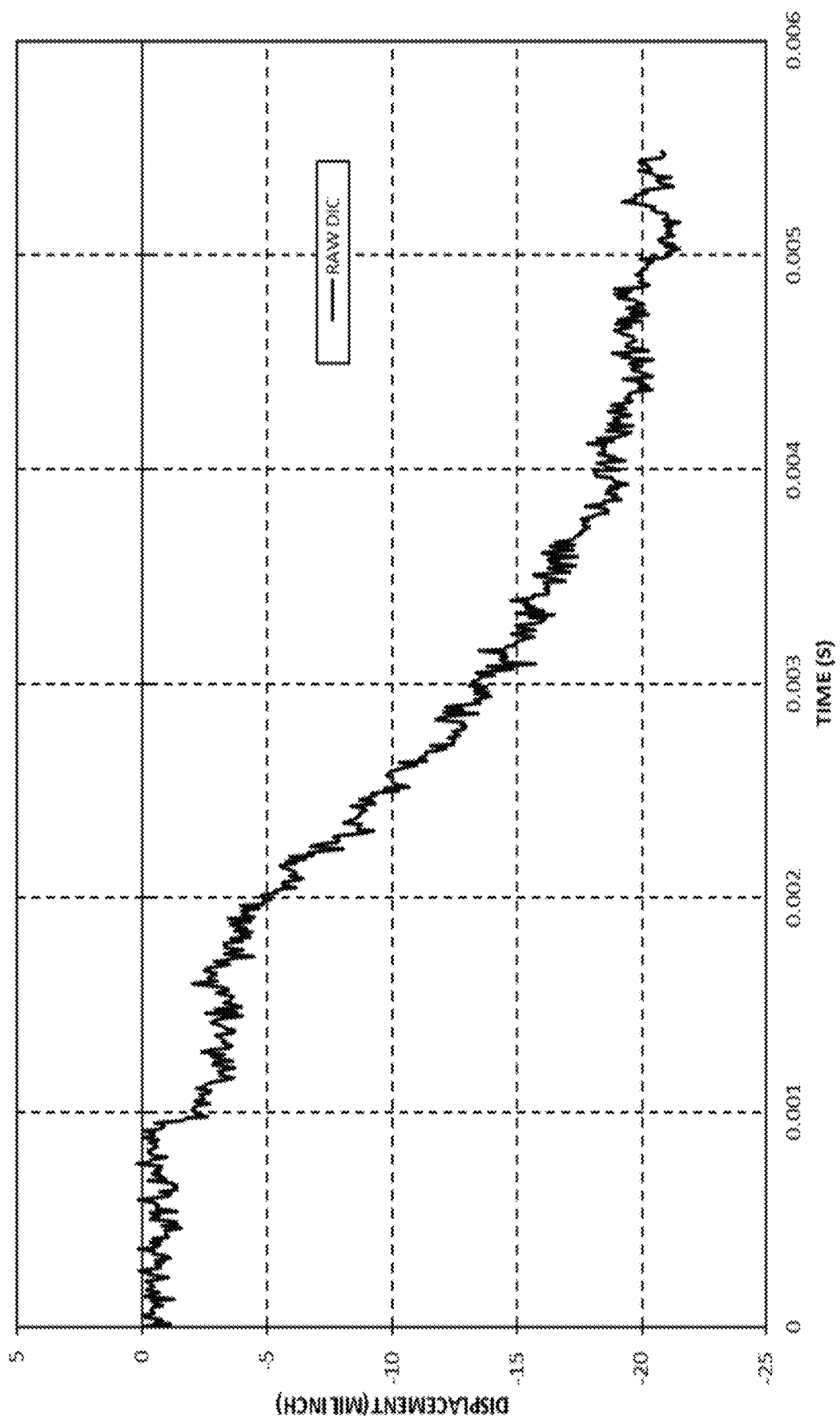
FIG. 5 illustrates a chart of an optically-derived displacement signal over time in accordance with embodiments of the present disclosure.

Included on the test fixture 104, the component of interest 124, the shock source device 128, non-filtered sensor 144, and/or the analog low-pass filtered sensor 148, is a target pattern tracking pattern/mark 140, and in some instances, a more specific speckle pattern 136. That is, since digital image correlation is an optical, non-contact method of measuring surface deformation in two or three dimensions, the process of acquiring displacement signals illustrative of surface deformation, as will be discussed further below, relies on tracking the displacement of a unique surface characteristics through a series of images 112. Such unique surface characteristics may comprise speckle pattern 136 and/or a tracking pattern/mark 140. The movement, or displacement, of a localized speckle pattern 136 and/or the tracking pattern/mark 140 on a component of interest 124, and in accordance with embodiments of the present disclosure—the non-filtered sensor 144 and the analog low-pass filtered sensor 148—is utilized to generate a displacement signal for the component. An example displacement signal over time is illustrated in FIG. 5. Such a displacement signal may be differentiated to calculate a velocity or other dynamic quantity of interest component. Further, the velocity may be differentiated or subject to further calculation to generate another dynamic quantity of interest component, such as acceleration.

In accordance with embodiments of the present disclosure, at least one displacement signal is generated for the component of interest 124, the non-filtered sensor 144, and the analog low-pass filtered sensor 148. Based on such displacement signals and further based on subsequent derived filtering characteristics and aliasing analyses, other displacement signals generated for components within the region of interest 132 may be filtered based on the previously derived filtering characteristic. Further, should the aliasing analyses indicate that the displacement signal for the component of interest 124 and/or the DIC-derived quantities of interest for the component of interest 124 are aliased, the same or similar technique for correcting and/or tagging aliased information for the other displacement signals generated for components within the region of interest 132 may be utilized.

In accordance with some embodiments of the present disclosure, sensors 144 and/or sensor 148 may be located outside the region of interest 132, for example as sensor 146 on the back of the test apparatus 104. Locating the sensors outside the region of interest 132 allows for more components of interest to be located within the finite region of interest. For example, adding more components within the region of interest is of high value when applied to costly pyrotechnic shock testing.

To enable such an implementation, the ability to extrapolate the corresponding optical measurements within the region of interest 132 to the sensor locations outside the region of interest 132 with certainty appropriate to meet the intent of the application of the proposed method is required. For example, one or both of the at least two sensors 144 and 148 may be located outside the region of interest 132, such as on the back of the test apparatus 104 as sensor 146, provided the optical measurements used for comparison within the region of interest 132 may be extrapolated with some degree of certainty. As one example, thin plate responses across the thickness of a plate can be practically neglected over a range of response frequencies. A sensor of known location, relative to an optical measurement within the region of interest, on the back of a region of interest for a plate can still be implemented in accordance with embodiments of the present disclosure. If, however, thickness cannot be neglected but corrections are known with adequate detail and certainty, the sensor may still be located on the back of a region of interest 132.

As another example, considering a point along a cantilevered beam in pure transverse motion at first mode resonance, if the region of interest 132 is on the top of the beam, sensors may be located at a known location relative to the top region of interest on the non-visible bottom half of the beam because the sensor response may be corrected with simple beam theory. For instance, simple beam theory predicts top members of a cantilever beam to be in tension while bottom members are compressed. Thus, a sensor response would simply be in the opposite direction as the optically-derived measurements in this case. By simply flipping a sensor sign response for this case, embodiments described herein may be implemented provided beam theory, which neglects effects, such as transverse shear, meets the intent of the application.

It is important to note that any combination of analog sensors whose measurement can be correlated with optical tracking measurement systems products can be used to provide alias protection. Accordingly, examples of sensors 144, 146, and 148 include, but are not limited to, an analog strain gauge, an analog accelerometer, a linear variable displacement transformer (LVDT), and/or combinations thereof. For example, an analog strain gauge and analog anti-aliased accelerometer or analog anti-aliased strain gauge and analog accelerometer might be used as the sensors 144 and 148. Accordingly, any combination of analog and analog anti-aliased sensors may be used depending on a testing intent.

Figure 2:
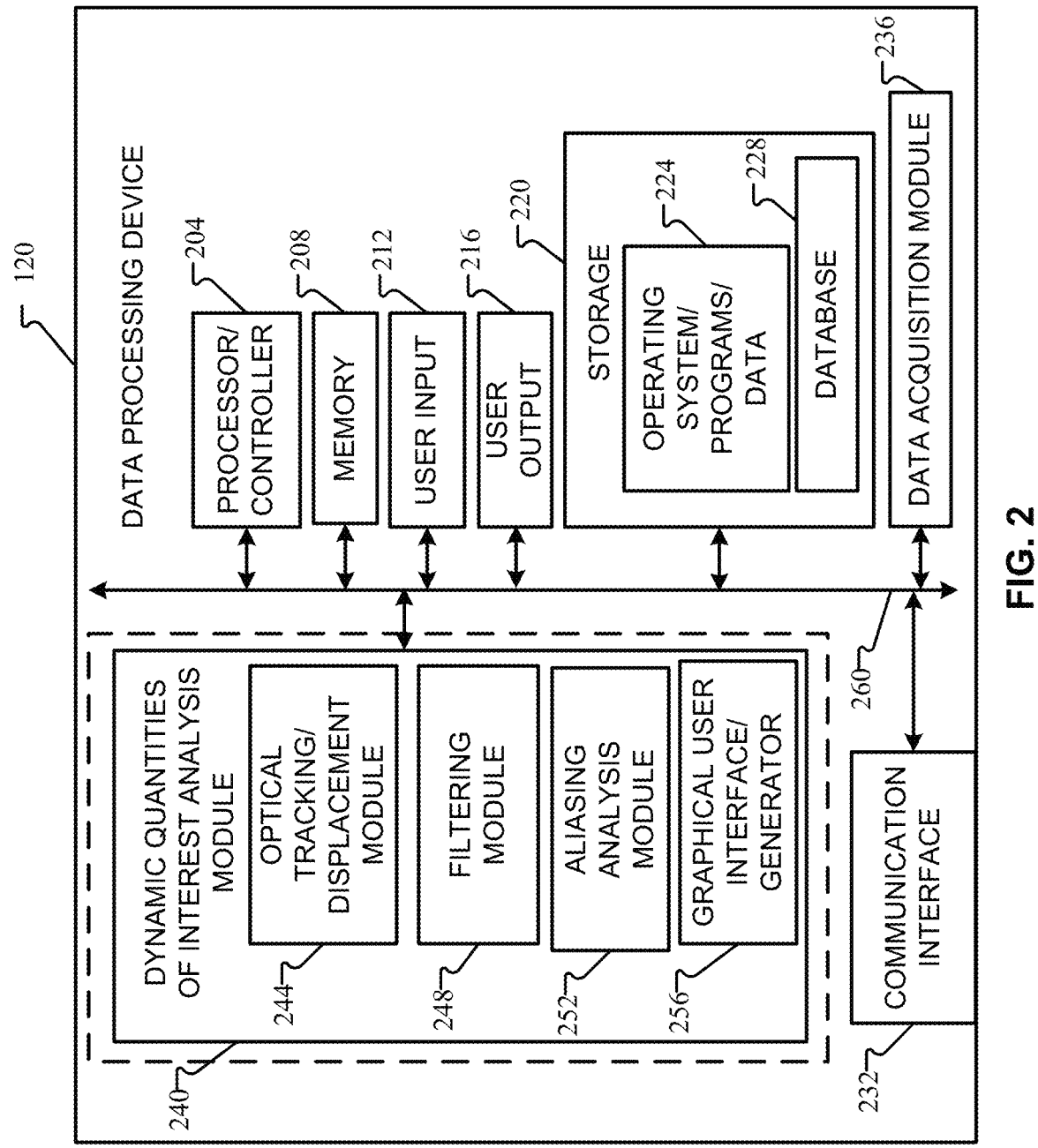
FIG. 2 is a block diagram of a data processing system in accordance with an exemplary embodiment of the present disclosure.

FIG. 2 depicts additional details with respect to a data processing system in accordance with embodiments of the present disclosure. More particularly, the data processing system 120 may generally include a processor 204, memory 208, user input 212, user output 216, storage 220, a communication interface 232, a dynamic quantities of interest analysis module 240, and, in some instances, a data acquisition module 236. Processor 204 is provided to execute instructions contained within memory 208. Accordingly, the processor 204 may be implemented as any suitable type of microprocessor or similar type of processing chip, such as any general-purpose programmable processor, digital signal processor (DSP) or controller for executing application programming contained within memory 208. Alternatively, or in addition, the processor 204 and memory 208 may be replaced or augmented with an application specific integrated circuit (ASIC), a programmable logic device (PLD), or a field programmable gate array (FPGA).

The memory 208 generally comprises software routines facilitating, in operation, pre-determined functionality of the data processing device 120. The memory 208 may be implemented using various types of electronic memory generally including at least one array of non-volatile memory cells (e.g., Erasable Programmable Read Only Memory (EPROM) cells or FLASH memory cells, etc.). The memory 208 may also include at least one array of dynamic random access memory (DRAM) cells. The content of the DRAM cells may be pre-programmed and write-protected thereafter, whereas other portions of the memory 208 may be selectively modified or erased. The memory 208 may be used for either permanent data storage or temporary data storage. Alternatively, or in addition, data storage 220 may be provided. The data storage 220 may generally include storage for programs and data 224, storage for one or more modules included in the dynamic quantities of interest analysis module 240, and storage for a database 228. The database 228 may store data associated with the dynamic quantities of interest analysis module 240 and/or the data acquisition module 236. The communication interface 232 may allow the data processing device 120 to communicate over a communication network and/or communicate with one or more data acquisition systems 116A-B and/or directly with the one or more cameras 108A-B. Further, the data processing system 120 may include a portion of, or an entirety of, a data acquisition system 116 within the data acquisition module 236. For example, the data acquisition module 236 may include the same or similar functionality and capability as one or more of the data acquisition systems 116A-B as previously discussed.

The applications of generating dynamic quantities of interest with alias protection based on digital image optical tracking techniques may be at least partially provided by the dynamic quantities of interest analysis module 240. That is, the optical tracking/displacement module 244 of the dynamic quantities of interest analysis module 240 may generate one or more displacement signals based on optically-acquired information, such as optically-acquired information from the series of images 112. As will be discussed below, the optical tracking/displacement module 244 may utilize a variety of techniques to generate one or more displacement signals for the component of interest 124, the non-filtered sensor 144, the analog low-pass filtered sensor 148, and/or other elements within the region of interest 132 based on the series of images 112.

The optical tracking/displacement module 244 may utilize a variety of motion tracking methods. Examples of motion tracking methods include, but are not limited to, target motion tracking, feature-based motion tracking, pattern projection tracking, and DIC tracking. Whereas a special pattern and/or other target may be affixed to a component of interest for DIC tracking and target motion tracking techniques, less invasive motion tracking methods, such as feature-based motion tracking and pattern projection tracking may be utilized. For example, pattern projection-based tracking, where a pattern is projected and detected, may be utilized in some instances. However, due to the inherent limitations in pattern projection technology (e.g., being limited to a specific frame rate) applications of such tracking techniques may be limited in practice.

The filtering module 248 of the dynamic quantities of interest analysis module 240 may apply one or more filtering algorithms to remove or otherwise reduce an amount of noise from one or more of the previously mentioned displacement signals. That is, in accordance with embodiments of the present disclosure, the filtering module 248 may apply wavelet filtering techniques to reduce or otherwise remove noise from one or more displacement signals generated by the optical tracking/displacement module 244. Alternatively, or in addition, the filtering module 248 may utilize best fit techniques to adjust a filter type, and, in some instances, other characteristics of the filter, such as, but not limited to, a decomposition level and whether to implement thresholding, to achieve a best fit between an optically-derived quantity of interest and an associated sensor-derived dynamic quantity of interest. For example, a wavelet type and a wavelet decomposition level may be selected to achieve a best fit between a DIC-derived quantity of interest based on a displacement signal generated for the non-filtered sensor 144 and the associated sensor-derived calculation of the dynamic quantity of interest based on the sensor signal, or data, from the non-filtered sensor 144. Similarly, a wavelet type and a wavelet decomposition level may be selected to achieve a best fit between a DIC-derived quantity of interest based on a displacement signal generated for the analog low-pass filtered sensor 148 and the associated sensor-derived calculation of the dynamic quantity of interest based on the sensor signal, or data, from the analog low-pass filtered sensor 148. The wavelet type and the wavelet filter for each of the non-filtered sensor 144 and the analog low-pass filtered sensor 148 may be the same or different. Examples of wavelet filters that may be used to de-noise an optically-derived displacement signal include, but are not limited to, Haar, Daubechies, Symlets, Coiflets, BiorSplines, ReverseBior, Meyr, Dmeyer, Gaussian, Mexian Hat, Morlet, Complex Gaussian, Shannon, Frequency B-Spline, and Complex Morlet.

The aliasing analysis module 252 of the dynamic quantities of interest analysis module 240 may apply one or more techniques to determine if aliasing is, or is likely to be, present or otherwise influence one or more optically-derived (e.g., DIC-derived) dynamic quantities of interest. As previously discussed, a comparison can be made between the data acquired from the non-filtered sensor 144 and the analog low-pass filtered sensor 148 to determine if aliasing at the non-filtered sensor 144 is contributing to or otherwise causing erroneous results in the data acquired from the analog low-pass filtered sensor 148 and/or the optically-derived dynamic quantities of interest. For example, the aliasing analysis module 252 may determine an amount of correlation, or agreement, between an SRS plot of data acquired from the non-filtered sensor 144, such as an accelerometer, and the analog low-pass filtered sensor 148, such as another accelerometer. The aliasing analysis module 252 may also determine if the amount of correlation, or agreement, is above or below a predetermined or selected threshold indicative of aliasing. Therefore, if the aliasing analysis module 252 determines that aliasing is likely to be present, the aliasing analysis module 252 may generate or otherwise provide an indication of such. For example, the aliasing analysis module 252 may communicate with the graphical user interface/generator 256 to cause the graphical user interface/generator 256 to generate an indication that aliasing may be present. The graphical user interface/generator 256 may then provide such indication to an output device, such as user output 216.

Alternatively, or in addition, the aliasing analysis module 252 may determine if one or more of the optically-derived (e.g., DIC-derived) dynamic quantities of interest best resembles the dynamic quantity of interest generated from the non-filtered sensor 144 or the analog low-pass filtered sensor 148. That is, if a correlation value, or best fit value, for the optically-derived dynamic quantity of interest for the analog low-pass filtered sensor 148 and the quantity of interest derived from the sensor signal, or data, from the analog low-pass filtered sensor 148 indicates a better match than a correlation value, or best fit value, for the optically-derived dynamic quantity of interest for the non-filtered sensor 144 and the quantity of interest derived from the sensor signal, or data, from the non-filtered sensor 144, then such an indication may indicate that aliasing may be present. Accordingly, additional filtering techniques may be applied to optically-derived dynamic quantities of interest, and/or raw data, such as displacement data, from other components within the region of interest 132, such as the component of interest 124 or the region of interest 132 itself, to remove effects due to aliasing. Alternatively, or in addition, the optically-derived dynamic quantities of interest, and/or displacement data, from the other components within the region of interest 132, such as the component of interest 124, may be tagged, or otherwise identified, and excluded from further consideration. Alternatively, or in addition, since the impacts of aliasing may be specific to one or more frequencies and/or one or more frequency ranges, the aliasing analysis module 252 may identify such frequencies and/or ranges. Such indications and/or results from the aliasing analysis module 252 may be provided to or otherwise utilized by the graphical user interface/generator 256. The various components of the computing system 120 may communicate utilizing the bus 260.

Figure 3:
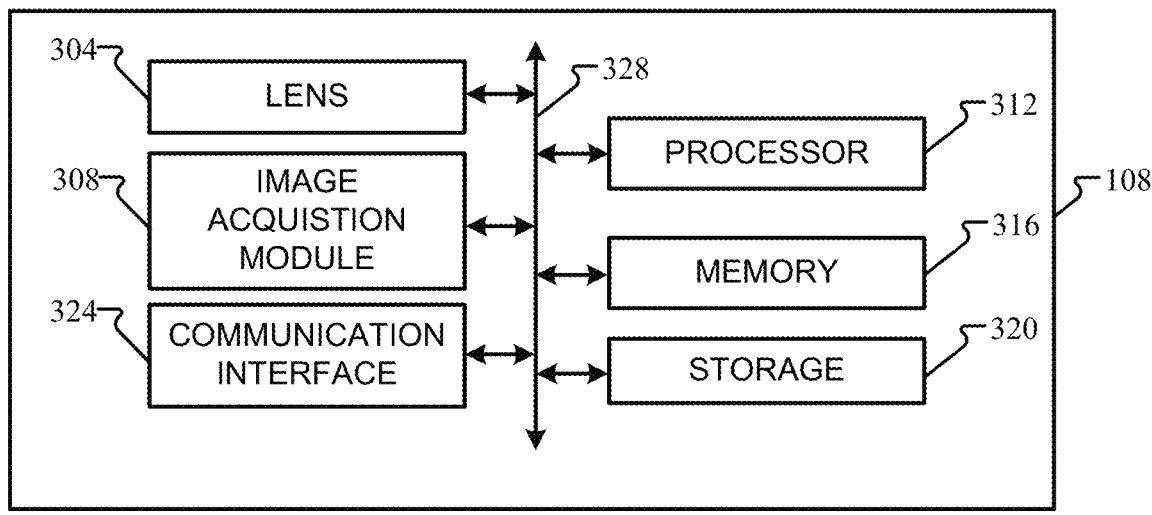
FIG. 3 is a block diagram depicting details of a camera and a data acquisition system in accordance with an exemplary embodiment of the present disclosure.
Figure 3:
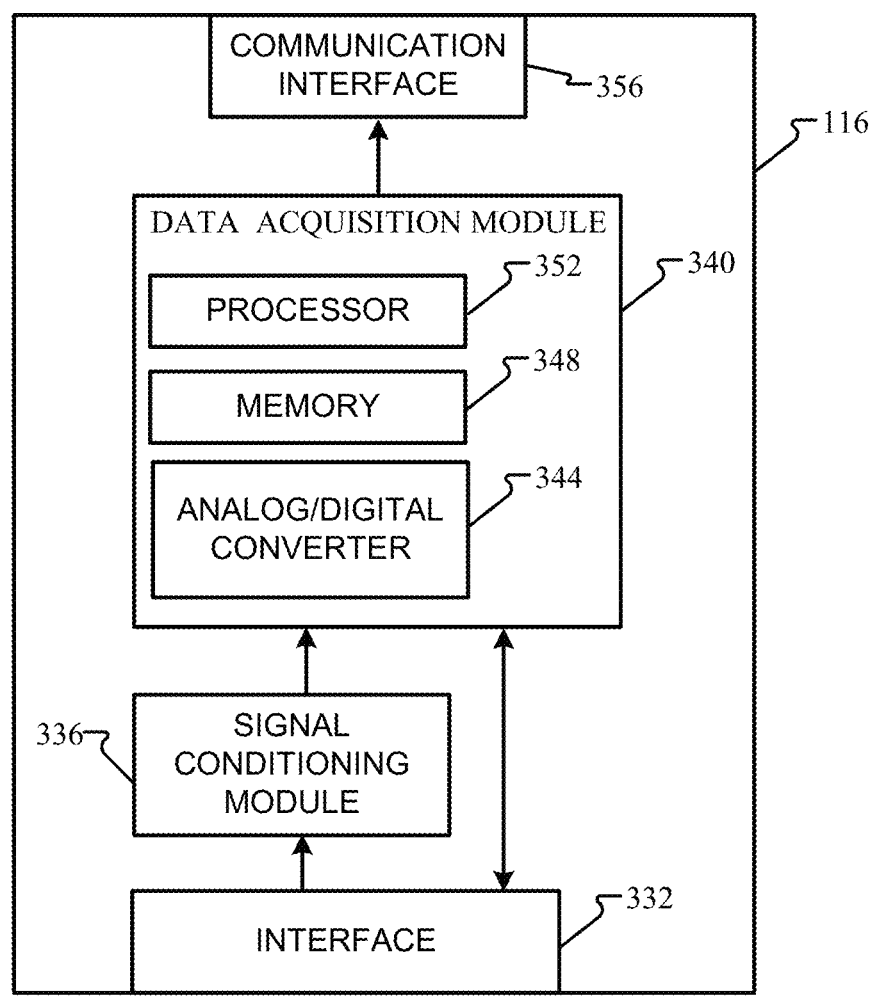

In accordance with embodiments of the present disclosure, additional details of the one or more cameras 108A-B and the data acquisition system 116A-B are provided in FIG. 3. The one or more cameras 108A-B may include a lens 304, image acquisition module 308, communication interface 324, processor 312, memory 316, storage 320, and a bus 328. The lens 304 may focus light indicative of an image onto a surface such that the image acquisition module 308 may convert the light into a digital image. The processor 312 may be the same as or similar to the processor/controller 204 previously discussed; accordingly, the description of processor 312 has been omitted. The memory 316 generally comprises software routines facilitating, in operation, predetermined functionality of the one or more cameras 108A-B and may be used for either permanent data storage or temporary data storage. The memory 316 may be the same as or similar to the memory 208; accordingly, the description of the memory 316 has been omitted. The data storage 320 may generally include storage for programs and data, storage for one or more modules included in the one or more cameras 108A-B, and storage for a series of images 112. That is, the storage 320 may acquire a series of images 112 and provide the series of images 112 to the data processing system 120 via the communication interface 324 and/or the data acquisition system 116A-B. In some instances, the cameras 108A-B may obtain the series of images 112 during a test; such series of images 112 may be stored within the memory 316 and/or storage 320 such that bandwidth limitations of the data acquisition system as well as the cables connecting the cameras 108A-B to either the data acquisition system 116A-B or the data processing system 120 do not affect the image acquisition process. Accordingly, acquired series of images 112 may be subsequently transferred to and analyzed at the data processing system 120. Various components of the one or more cameras 108A-B may communicate utilizing the bus 328.

In accordance with embodiments of the present disclosure, the data acquisition system 116A-B may include an interface 332 for receiving one or more signals. The interface 332 may receive signals from the non-filtered sensor 144 and the analog low-pass filtered sensor 148. The signal from the analog low-pass filtered sensor 148 may be passed to the signal conditioning module 336. The signal conditioning module 336 may apply a low-pass filter with a cutoff frequency and cutoff rate as previously discussed. The signal from the non-filtered sensor 144 and the analog low-pass filtered sensor 148 may then be supplied to the data acquisition module 340. The data acquisition module 340 may include a processor 352, memory 348, and an analog/digital converter 344. The processor 352 may be the same as or similar to the processor/controller 204 previously discussed; accordingly, the description of processor 352 has been omitted. The memory 348 generally comprises software routines facilitating, in operation, pre-determined functionality of the data acquisition system 116A-B and may be used for either permanent data storage or temporary data storage. The memory 348 may be the same as or similar to the memory 208; accordingly, the description of the memory 348 has been omitted. In operation, the analog/digital converter 344, together with the processor 352 and the memory 348, may sample one or more signals from the interface 332 and convert the signals into digital form. The digitized signals may be stored temporality in the memory 348 before being passed to the data processing system 120 via a communication interface 356. Alternatively, or in addition, the data acquisition system 116A-B may be included within, or part of, the data processing system 120; accordingly, the digitized signals may be passed to other components of the data processing system 120.

In some instances, the data acquisition system 116A-B may include the ability to receive the series of images 112 from the one or more cameras 108A-B. The series of images 112, already having been digitized, may, in some instances, be conditioned via the signal conditioning module 336 and may then be provided to the data processing system 120 via the communication interface 356. In other instances, the series of images 112 from the one or more cameras 108A-B may be provided directly to the data processing system 120. It should be understood that a series of images 112 refers to one or more images from one or more cameras 108A-B. That is, in accordance with embodiments of the present disclosure, a series of images 112 may be acquired by one or more cameras 108A-B and may be provided as a series or individually to the data processing system 120. In an embodiment, an "image" may include a full image. In another embodiment, an "image" may include a portion of an image, a segment of a full image, a thumbnail of an image, and/or an icon that pertains to an image. Another embodiment of an "image" may include a photograph and/or a digital image that can be captured by an image capture device, such as, for example, the one or more cameras 108A-B. Certain embodiments of a streaming image may include a video that may be captured by the one or more cameras 108A-B, and the streaming image, or images, may be provided to the data acquisition system 116A-B and/or the data processing system 120.

Figure 4:
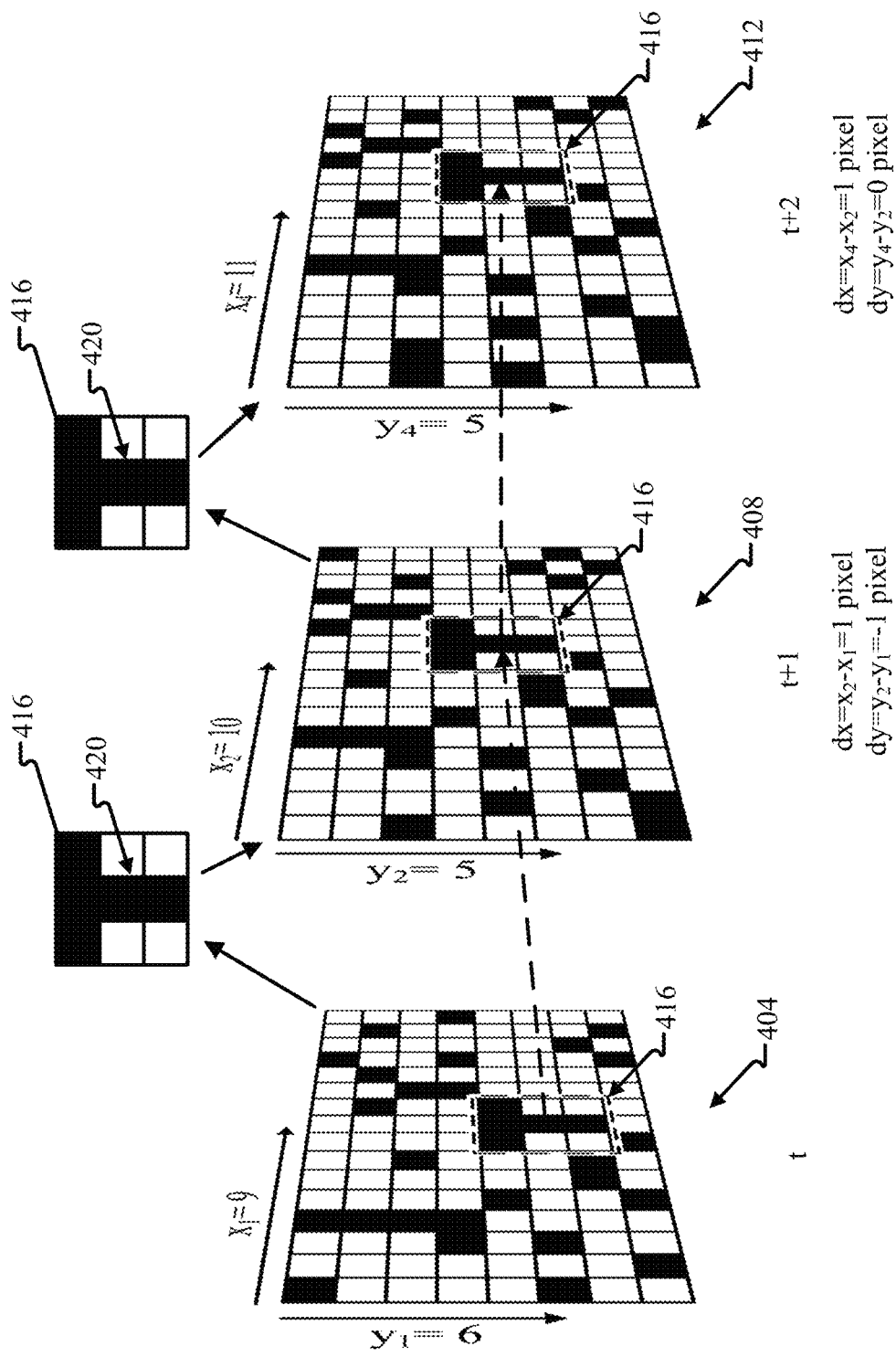
FIG. 4 depicts a schematic overview of an example correlation process in accordance with embodiments of the present disclosure.

FIG. 4 provides a schematic overview of an example correlation process for one or more pixels in accordance with embodiments of the present disclosure. A series of images 404, 408, and 412, corresponding to a particular point in time t, t+1, and t+2, respectively, depict a displacement of area of interest 416. The series of images 404, 408, and 412, may be acquired by the one or more cameras 108A-B and each of which may correspond to an entire image in the series of images 112 or may correspond to a portion of an image in the series of images 112. Such a series of images 404, 408, and 412 may also correspond to a specific frame in a stream of images.

Alternatively, or in addition, images 404, 408, and 412 may correspond to a synthesized image of a three-dimensional contour based on an image acquired by camera 108A and an image acquired by camera 108B. Alternatively, or in addition, images 404, 408, and 412 may correspond to a synthesized image of a three-dimensional contour based on an image acquired by camera 108A, an image acquired by camera 108B, and a third camera. Accordingly, although the images 404, 408, and 412 depict a two-dimensional correlation process, which may be achieved using a single camera 108, techniques described herein are applicable to a three-dimensional correlation process as well. That is, for three-dimensional measurements, at least two cameras are utilized. Assuming the positions of the at least two cameras relative to each other are known, as well as magnifications of the lenses and other imaging parameters, the absolute three-dimensional coordinates of any surface point of a component of interest 124 may be calculated resulting in a three-dimensional surface contour. Therefore, the pixel of interest, or area of interest, may be tracked through each image 404, 408, and 412 in three dimensions.

Referring again to FIG. 4, at a time equal to t, the image 404 is acquired. Within image 404, a particular pixel of interest 420 may be specified, of which a box, or correlation square 416 around the pixel of interest 420 may be specified. In some instances, the pixel of interest 420 may be two-dimensionally and/or three-dimensionally tracked from image to image (i.e., 404, 408, and 412) where a displacement signal corresponding to the movement of the pixel of interest 420 within the images 404, 408, and 412 is recorded. Alternatively, or in addition, the correlation square 416 may be two-dimensionally and/or three-dimensionally tracked from image to image (i.e., 404, 408, and 412), where a displacement signal corresponding to the movement of the correlation square 416 within the images is recorded and is provided as a displacement signal. That is, as illustrated in FIG. 4, the absolute and/or relative displacement of the pixel of interest 420 and/or the correlation square 416 between image 404 at a time equal to t and image 408 at a time equal to t+1 may be calculated. For example, the displacement of the pixel of interest 420 and/or the correlation square 416 between image 404 at a time equal to t and image 408 at a time equal to t+1 is one pixel in the x direction and one pixel in the negative y direction. Similarly, the displacement of the pixel of interest 420 and/or the correlation square 416 between image 408 at a time equal to t+1 and image 412 at a time equal to t+2 is one pixel in the x direction and no pixels in the y direction. Of course, if the pixel of interest 420 and/or the correlation square 416 were tracked three-dimensionally, a displacement in the z direction may be obtained. In some instances, the pixel of interest 420 and/or the correlation square 416 may correspond to the speckle pattern 136 and/or tracking pattern/mark 140 of the component of interest 124, the non-filtered sensor 144, and/or the analog low-pass filtered sensor 148.

As a simplified example, a normalized cross-correlation process may be utilized to correlate a part of the source image, such as a correlation square 416 within the image 404, to a target image, such as image 408. In some embodiments, the grey scale levels of the pixels in the correlation square 416 within the source image may be compared to all of the pixels, or a localized subset of pixels, within the target image 408. Of all the locations searched, a location in the target image that corresponds best to the correlation square 416 may be based on the highest correlation value. A resulting displacement, such as displacement in x and y directions as illustrated in FIG. 4, may then be generated. Of course, other methods and digital correlation processes may be utilized resulting in higher accuracy. For example, a grid pattern with multiple rows and columns of grid points in the source image may be matched or otherwise correlated to an area in the target image. A resulting displacement of the grid points may then be utilized to generate a displacement signal. The displacement signal may be for a single direction or axis, such as in the x direction, or a combination of directions. For example, a displacement vector, indicative of an amount of displacement from an origin point in the x, y, and z directions may be generated. FIG. 5 generally illustrates an example of a displacement signal in accordance with embodiments of the present disclosure. That is, a raw unfiltered digital image correlation signal is illustrated over time. As previously discussed, such an optically-derived displacement signal may correspond to a displacement signal for the component of interest 124, the region of interest 132, the non-filtered sensor 144, the analog low-pass filtered sensor 148, and/or another location or component within the region of interest 132.

Figure 6A:
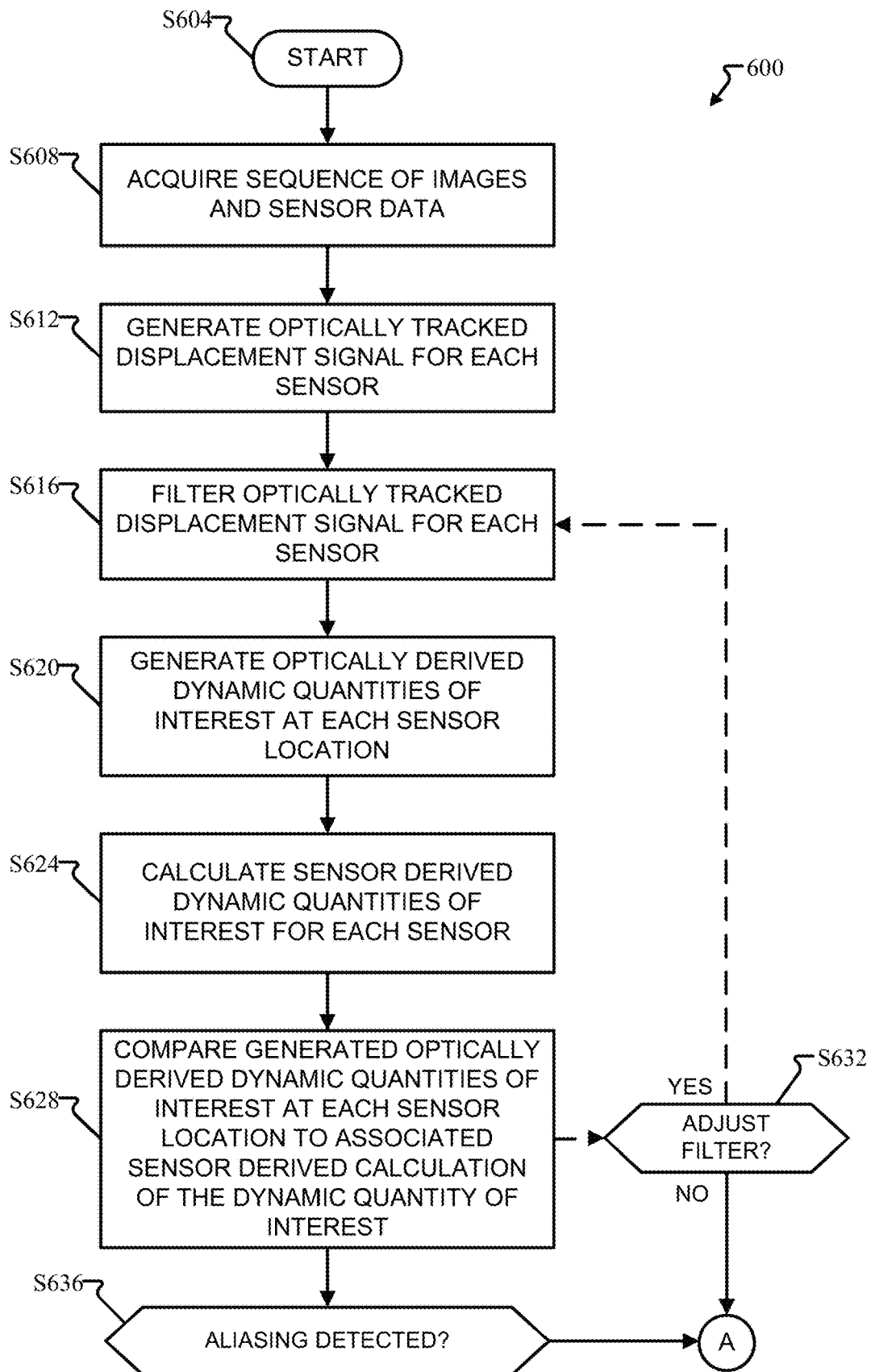
FIGS. 6A-6B depict a flow diagram of a first method for providing filtering and aliasing protection for optically-derived dynamic quantities of interest in accordance with embodiments of the present disclosure.
Figure 6B:
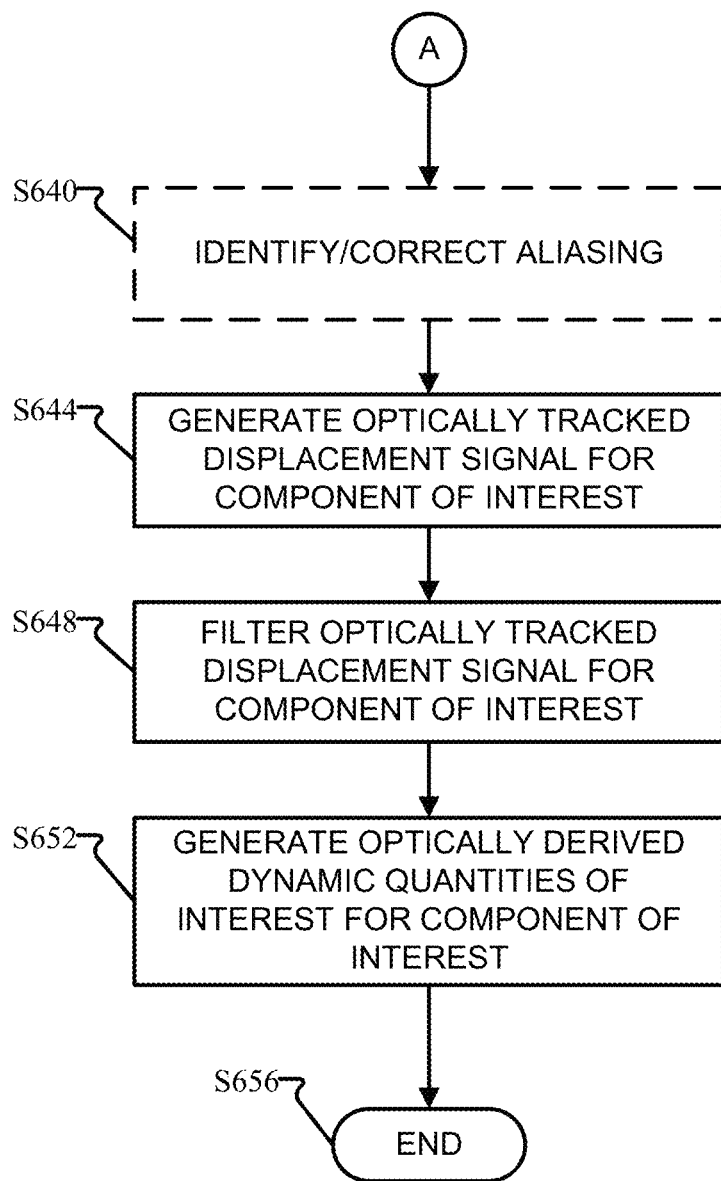

Referring now to FIG. 6, a method 600 for realizing the practical applications of optically-generated dynamic quantities of interest with alias protection based on a series of images will be discussed in accordance with embodiments of the present disclosure. Method 600 is in embodiments performed by one or more devices, such as the one or more devices included in the system 100. More specifically, one or more hardware and software components including the data processing system 120 in conjunction with information provided by the one or more cameras 108A-B, a data acquisition system 116A-B, a non-filtered sensor 144, and/or an analog low-pass filtered sensor 148 may be involved in performing method 600. In one embodiment, one or more of the previously described modules and/or devices perform one or more of the steps of method 600. The method 600 may be executed as a set of computer-executable instructions, executed by a data processing system 120 in conjunction with information provided from the one or more cameras 108A-B, a data acquisition system 116A-B, a non-filtered sensor 144, and/or an analog low-pass filtered sensor 148, encoded or stored on a computer-readable medium. Hereinafter, the method 600 shall be explained with reference to systems, components, modules, software, etc. described with reference to FIGS. 1-5.

Method 600 may continuously flow in a loop, flow according to a timed event, or flow according to a change in an operating or status parameter. Method 600 is initiated at step S604 where a test of the component of interest 124 using a shock source device 128 is initiated. At step S608, a series of images 112 is acquired by the one or more cameras 108A-B and is provided to the data acquisition system 116A-B and/or the data processing system 120. As previously discussed, the series of images 112 includes the non-filtered sensor 144 and the analog low-pass filtered sensor 148 within the region of interest 132. Alternatively, or in addition, one or more of the sensors 144 and 148 may be located outside the region of interest 132. Simultaneously with the acquisition of the series of images 112, sensor data from a non-filtered sensor 144 and an analog low-pass filtered sensor 148 is acquired. Such sensor data may be provided to the data acquisition system 116A-B and/or the data processing system 120. Further the non-filtered sensor 144 and the analog low-pass filtered sensor 148 may be the same type of sensor, where the signal from the analog low-pass filtered sensor 148 is subject to low-pass filtering at the data acquisition system 116A-B. Alternatively, or in addition, the analog low-pass filtered sensor 148 may include a low-pass filter.

At step S612, a displacement signal for each of the non-filtered sensor 144 and the analog low-pass filtered sensor 148 is generated based on one or more optical tracking techniques. As previously discussed, one or more optical tracking techniques, such as digital image correlation, may be used to track the surface displacement and/or deformation of the non-filtered sensor 144 and generate a displacement signal representative of such based on the series of images 112 and the movement of the speckle pattern 136 and/or the tracking pattern/mark 140. Similarly, one or more optical tracking techniques, such as digital image correlation, may be used to track the surface displacement and/or deformation of the analog low-pass filtered sensor 148 and generate a displacement signal representative of such based on the series of images 112 and the movement of the speckle pattern 136 and/or the tracking pattern/mark 140.

At step S616, the optically-generated displacement signal based on the series of images 112 for the non-filtered sensor 144 and the analog low-pass filtered sensor 148 may be filtered. As previously discussed, a wavelet filter may be used to filter each of the generated displacement signals. The wavelet filter type and decomposition level may be predetermined and/or preselected based on, for example, a test type, a displacement signal range, a perceived noise measurement, an actual noise measurement, the result of step S628, and/or a combination thereof. Method 600 may then proceed to step S620 where an optically-derived dynamic quantity of interest is generated for the non-filtered sensor 144 and/or the analog low-pass filtered sensor 148 based on the respective optically-tracked displacement signals for the non-filtered sensor 144 and/or the analog low-pass filtered sensor 148.

At step S624, a sensor derived dynamic quantity of interest is calculated for each of the non-filtered sensor 144 and the analog low-pass filtered sensor 148. That is, based on sensor data provided from the sensor, a dynamic quantity of interest is calculated. Accordingly, at step S628, the generated optically-derived dynamic quantity of interest for each of the sensors is compared to the associated sensor-derived calculation of the dynamic quantity of interest. For example, at step S628 an indication of how well the optically-derived dynamic quantity of interest matches the sensor-derived calculation of the dynamic quantity of interest may be generated. Such an indication may be based on a similarity algorithm, such as the sum of the absolute differences between the optically-derived dynamic quantity of interest and the sensor-derived calculation of the dynamic quantity of interest for each sensor. Other similarity algorithms, such as, but not limited to, the sum of the squared differences and variance, are also contemplated. Based on the comparison score, for example, the filter may be adjusted at step S632. That is, if the similarity comparison indicates that the sum of the squared differences is high, a different wavelet filter decomposition level and/or a different wavelet filter altogether may be selected. Accordingly, steps S616 to S632 may repeat until the similarity score is below a predetermined and/or preselected threshold. Alternatively, or in addition, a predetermined number of wavelet filters and/or a predetermined number of wavelet decomposition levels for each wavelet filter may be evaluated at steps S616 to S632, where the wavelet filter and wavelet decomposition level yielding a highest similarity, for example the lowest SSD value, may be chosen as the final wavelet filter and the final wavelet filter decomposition level.

The existence of aliasing and/or the determination as to whether aliasing is likely to be present may occur at step S636. At step S636, the sensor data from the non-filtered sensor 144 and the analog low-pass filtered sensor 148 may be compared. Such a comparison may rely on raw sensor data and/or other derived measures based on the raw sensor data. For example, a similarity algorithm, as previously discussed, may be used to determine a similar score, such as a sum of squared differences, between the raw sensor data for the non-filtered sensor 144 and the raw sensor data for the analog low-pass filtered sensor 148. Alternatively, or in addition, the power spectral densities for both the non-filtered sensor 144 and the analog low-pass filtered sensor 148 may be evaluated. Alternatively, or in addition, the presence of aliasing may be determined based on a comparison, or similarity, between each of the sensor-derived calculations of the dynamic quantity of interest. As one non-limiting example, when evaluating the shock response spectrum for each of the non-filtered sensor 144 and the analog low-pass filtered sensor 148, the SRS for the non-filtered sensor 144 may be higher at some or all frequencies than the SRS for the analog low-pass filtered sensor 148. Such an offset, or deviation, may indicate that aliasing is or is likely to be present.

Alternatively, or in addition, the determination as to whether aliasing is or is likely to be present may be based at least partially on whether the optically-derived dynamic quantity of interest for each sensor location is more similar to the sensor derived dynamic quantity of interest for the non-filtered sensor 144 or the sensor derived dynamic quantity of interest for the analog low-pass filtered sensor 148. That is, if the similarity is greater between the optically-derived dynamic quantity of interest for the non-filtered sensor 144 and the sensor-derived dynamic quantity of interest for the non-filtered sensor 144 than the similarity between the optically-derived dynamic quantity of interest for the analog low-pass filtered sensor 148 and the sensor-derived dynamic quantity of interest for the analog low-pass filtered sensor 148, aliasing may exist or otherwise may be influencing the optically-derived dynamic quantity of interest. For example, aliasing may cause the optically-derived dynamic quantity of interest to be slightly higher than or otherwise offset from the sensor-derived dynamic quantity of interest resulting in such a lower similarity. Accordingly, as a result of step S632, an indication as to whether aliasing is or is likely to be present may be generated based on such comparisons.

For example, if aliasing is likely to be present, the optically-derived dynamic quantity of interest may be corrected, tagged, or indicated as potentially erroneous at optionally identified step S640. Alternatively, or in addition, an optically-derived displacement signal for the component of interest 124 may be generated at step S644. Based on the determination of a wavelet filter type and decomposition level by any of steps S616 to S632, the optically-derived displacement signal for the component of interest 124 may be wavelet filtered at step S648. That is, the wavelet filter type and level may be applied to other optically-derived displacement signals based on the series of images 112. As previously indicated, the determined wavelet filter type and decomposition level at either of steps S616-S632 may be utilized to wavelet filter an optically-derived displacement signal for an object other than the non-filtered sensor 144 and/or the analog low-pass filtered sensor 148. Such object may be the component of interest 124 and/or the region of interest 132. Accordingly, dynamic quantities of interest based on the wavelet filtered optically-derived displacement signal for the component of interest 124 may be generated at step S652. Method 600 may then end at step S656.

Figure 7A:
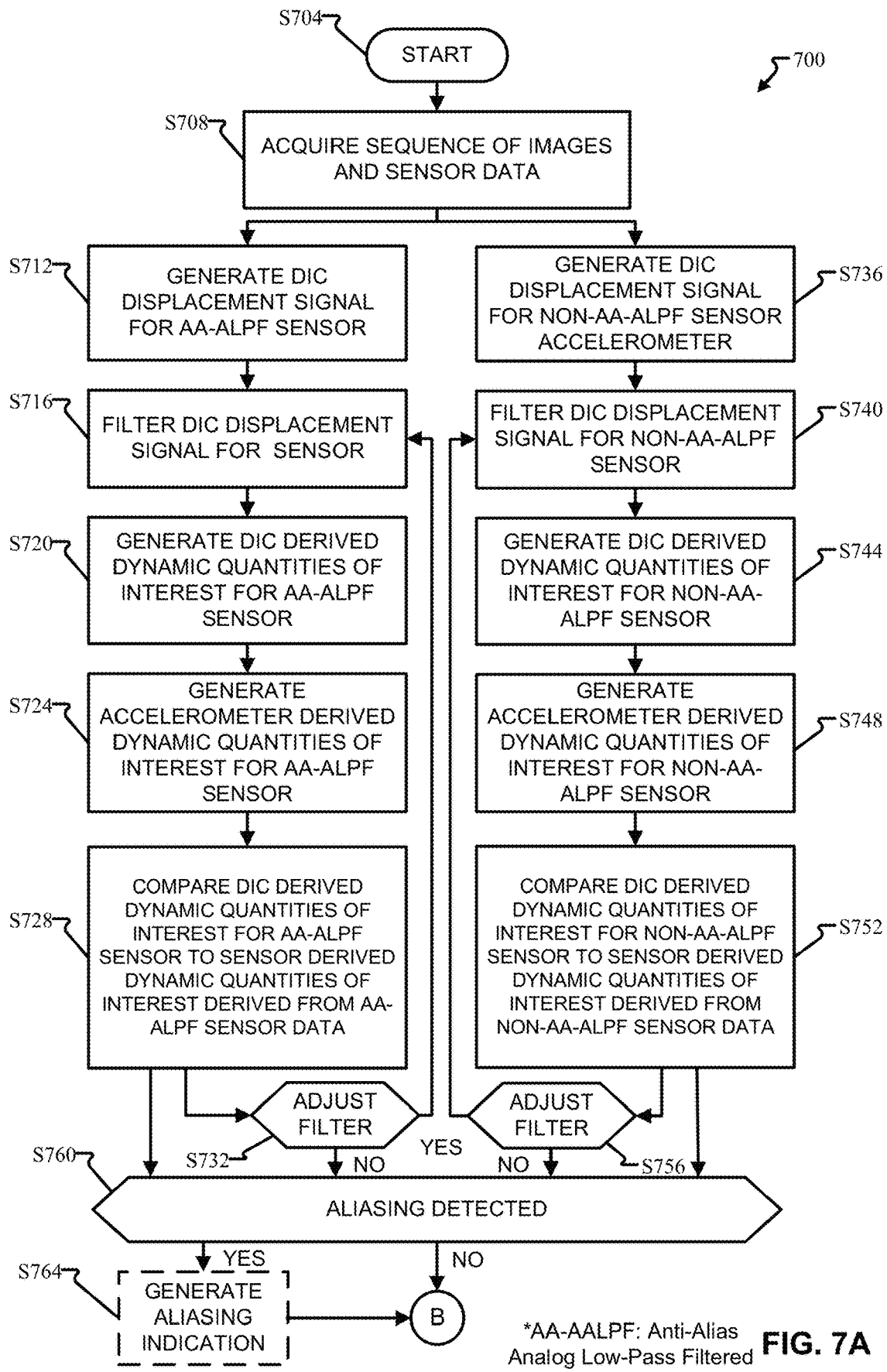
FIGS. 7A-B depict a flow diagram of a second method for providing filtering and aliasing protection for optically-derived dynamic quantities of interest in accordance with embodiments of the present disclosure.
Figure 7B:
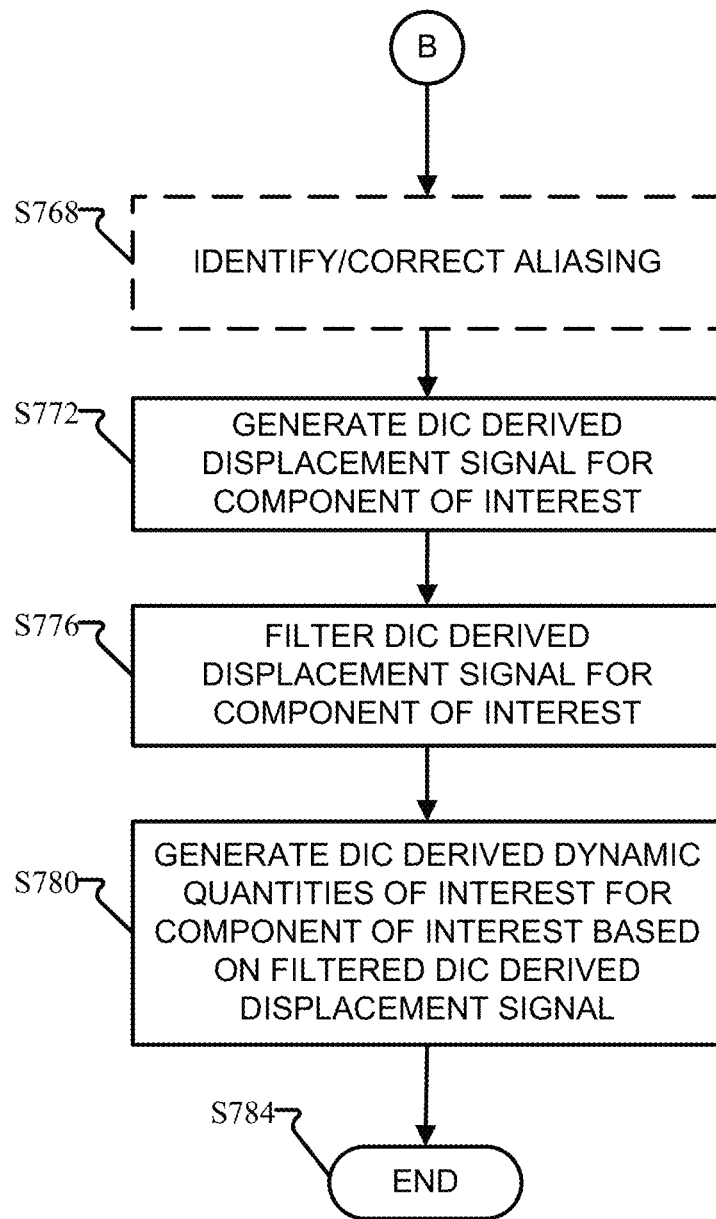

Referring now to FIG. 7, a method 700 for realizing the practical applications of digital image correlation derived dynamic quantities of interest with alias protection based on a series of images will be discussed in accordance with embodiments of the present disclosure. Method 700 is in embodiments, performed by one or more devices, such as the one or more devices included in the system 100. More specifically, one or more hardware and software components including the data processing system 120 in conjunction with information provided by the one or more cameras 108A-B, a data acquisition system 116A-B, a non-filtered sensor 144, and/or an analog low-pass filtered sensor 148 may be involved in performing method 700. In one embodiment, one or more of the previously described modules and/or devices perform one or more of the steps of method 700. The method 700 may be executed as a set of computer-executable instructions, executed by a data processing system 120 in conjunction with information provided from the one or more cameras 108A-B, a data acquisition system 116A-B, a non-filtered sensor 144, and/or an analog low-pass filtered sensor 148, encoded or stored on a computer-readable medium. Hereinafter, the method 700 shall be explained with reference to systems, components, modules, software, etc. described with FIGS. 1-6.

Method 700 may continuously flow in a loop, flow according to a timed event, or flow according to a change in an operating or status parameter. Method 700 is initiated at step S704 where a test of component of interest 124 using a shock source device 128 is initiated. At step S708, a series of images 112 is acquired by the one or more cameras 108A-B and provided to the data acquisition system 116A-B and/or the data processing system 120. As previously discussed, the series of images 112 includes the non-filtered sensor 144, such as a non-filtered accelerometer, and the analog low-pass filtered sensor 148, such as an analog low-pass filtered accelerometer, within the region of interest 132. Simultaneously with the acquisition of the series of images 112, accelerometer data from a non-filtered sensor 144 and an analog low-pass filtered sensor 148 is acquired. Such accelerometer data may be provided to the data acquisition system 116A-B and/or the data processing system 120. Further, the non-filtered sensor 144 and the analog low-pass filtered sensor 148 may be the same type of sensor, where the acceleration signal from the analog low-pass filtered sensor 148 is subject to low-pass filtering at the data acquisition system 116A-B. Alternatively, or in addition, the analog low-pass filtered sensor 148 may include a low-pass filter.

At step S712, a digital image correlation displacement signal for the analog low-pass filtered sensor 148 is generated in accordance with at least some of the previously discussed digital image correlation processing techniques. That is, DIC processing techniques may be utilized to generate a displacement signal based on the surface displacement and/or deformation of the analog low-pass filtered sensor 148. At step S716, the DIC-derived displacement signal based on the series of images 112 for the analog low-pass filtered sensor 148 may be filtered. As previously discussed, a wavelet filter may be used to filter the DIC-derived displacement signal to reduce and/or eliminate noise associated with the DIC displacement signal. The wavelet filter type and decomposition level may be predetermined and/or preselected based on, for example, a test type, a displacement signal range, a perceived noise measurement, an actual noise measurement, the result of step S732, and/or a combination thereof. Method 700 may then proceed to step S720 where a DIC-derived dynamic quantity of interest signal is generated based on the DIC-derived displacement signal for the analog low-pass filtered sensor 148. For example, a center difference differentiation may be utilized to calculate a first derivative of the DIC-derived displacement signal for the analog low-pass filtered sensor 148; such a calculation may be used to generate a DIC-derived velocity based on the DIC-derived displacement signal for the analog low-pass filtered sensor 148. Accordingly, a derivative of the DIC-derived velocity signal may be obtained; such a derivative may be used to obtain a DIC-derived acceleration signal. When determining DIC-derived dynamic quantity of interest data, for example a Shock Response Spectrum calculation, the DIC-derived acceleration signal may be used to generate such dynamic quantity of interest data.

Similarly, at step S724, a sensor-derived dynamic quantity of interest signal is generated based on one or more signals received from the analog low-pass filtered sensor 148. For example, to determine sensor-derived dynamic quantity of interest data, for example a Shock Response Spectrum calculation, an acceleration signal from the analog low-pass filtered sensor 148 may be used to generate such dynamic quantity of interest data. At step S728, the DIC-derived dynamic quantity of interest data for the analog low-pass filtered sensor 148 may be compared to the associated sensor-derived dynamic quantity of interest data. For example, at step S728, an indication of how well the DIC-derived dynamic quantity of interest matches the sensor-derived dynamic quantity of interest may be generated. Such an indication may be based on a similarity algorithm, such as the sum of the absolute differences between the DIC-derived dynamic quantity of interest and the sensor-derived dynamic quantity of interest for the analog low-pass filtered sensor 148. Other similarity algorithms, such as, but not limited to, the sum of the squared differences and variance, are also contemplated. Based on the comparison score, for example, at step S732, the filter may be adjusted. That is, if the similarity comparison indicates that the sum of the squared differences is high, a different wavelet filter decomposition level and/or a different wavelet filter altogether may be selected. Accordingly, steps S716 to S732 may repeat until the similarity score is below a predetermined and/or preselected threshold. Alternatively, or in addition, a predetermined number of wavelet filters and/or a predetermined number of wavelet decomposition levels for each wavelet filter may be evaluated at steps S716 to S732, where the wavelet filter and wavelet decomposition level yielding a highest similarity, for example the lowest SSD value, may be chosen as the final wavelet filter and the final wavelet filter decomposition level.

Steps S736 to S756 may be performed in parallel and/or may sequentially follow step S732. That is, the filter applied to the DIC-derived dynamic quantity of interest based on the non-filtered sensor 144 may be different from, or in some cases, the same as, the filter applied to the DIC-derived dynamic quantity of interest based on the analog low-pass filtered sensor 148. Accordingly, at step S736, the DIC-derived displacement signal based on the series of images 112 for the non-filtered sensor 144 may be filtered. As previously discussed, a wavelet filter may be used to filter the DIC-derived displacement signal to reduce and/or eliminate noise associated with the DIC displacement signal. The wavelet filter type and decomposition level may be predetermined and/or preselected based on, for example, a test type, a displacement signal range, a perceived noise measurement, an actual noise measurement, the result of step S756, and/or a combination thereof. Method 700 may then proceed to step S740 where a DIC-derived dynamic quantity of interest signal is generated based on the DIC-derived displacement signal for the non-filtered sensor 144. For example, a center difference differentiation may be utilized to calculate a first derivative of the DIC-derived displacement signal for the non-filtered sensor 144; such a calculation may be used to generate a DIC-derived velocity based on the DIC-derived displacement signal for the non-filtered sensor 144. Accordingly, a derivative of the DIC-derived velocity signal may be obtained; such a derivative may be used to obtain a DIC-derived acceleration signal based on the DIC displacement signal of the non-filtered sensor 144. When determining DIC-derived dynamic quantity of interest data, for example a Shock Response Spectrum calculation, the DIC-derived acceleration signal may be used to generate such dynamic quantity of interest data.

Similarly, at step S748, a sensor-derived dynamic quantity of interest signal is generated based on one or more signals received from the non-filtered sensor 144. For example, to determine sensor derived dynamic quantity of interest data, for example a Shock Response Spectrum calculation, an acceleration signal from the non-filtered sensor 144 may be used to generate such dynamic quantity of interest data. At step S752, the DIC-derived dynamic quantity of interest data for the non-filtered sensor 144 may be compared to the associated sensor-derived dynamic quantity of interest data. For example, at step S752, an indication of how well the DIC-derived dynamic quantity of interest matches the sensor-derived dynamic quantity of interest may be generated. Such an indication may be based on a similarity algorithm, such as the sum of the absolute differences between the DIC-derived dynamic quantity of interest and the sensor-derived dynamic quantity of interest for the non-filtered sensor 144. Other similarity algorithms, such as, but not limited to, the sum of the squared differences and variance, are also contemplated. Based on the comparison score, for example, at step S756, the filter may be adjusted. That is, if the similarity comparison indicates that the sum of the squared differences is high, a different wavelet filter decomposition level and/or a different wavelet filter altogether may be selected. Accordingly, steps S740 to S756 may repeat until the similarity score is below a predetermined and/or preselected threshold. Alternatively, or in addition, a predetermined number of wavelet filters and/or a predetermined number of wavelet decomposition levels for each wavelet filter may be evaluated at steps S740 to S756, where the wavelet filter and wavelet decomposition level yielding a highest similarity, for example the lowest SSD value, may be chosen as the final wavelet filter and the final wavelet filter decomposition level.

The existence of aliasing and/or the determination as to whether aliasing is likely to be present may occur at step S760. At step S760, the sensor data from the non-filtered sensor 144 and the analog low-pass filtered sensor 148 may be compared. Such a comparison may rely on raw sensor data and/or other derived measures based on the raw acceleration data. For example, a similarity algorithm, as previously discussed, may be used to determine a similar score, such as a sum of squared differences, between the raw sensor data for the non-filtered sensor 144 and the raw sensor data for the analog low-pass filtered sensor 148. Alternatively, or in addition, the power spectral densities for both the non-filtered sensor 144 and the analog low-pass filtered sensor 148 may be evaluated. Alternatively, or in addition, the presence of aliasing may be determined based on a comparison, or similarity, between each of the sensor-derived calculations of the dynamic quantity of interest. As one non-limiting example, when evaluating the shock response spectrum for each of the non-filtered sensor 144 and the analog low-pass filtered sensor 148, the SRS for the non-filtered sensor 144 may be higher at some or all frequencies than the SRS for the analog low-pass filtered sensor 148. Such an offset, or deviation, may indicate that aliasing is or is likely to be present. Accordingly, at step S764, an indication indicating aliasing is or is likely to be present is generated. Such an indication may be rendered to, or otherwise presented to a display, such as the user output 216.

Alternatively, or in addition, the determination as to whether aliasing is or is likely to be present may be based at least partially on whether the DIC-derived dynamic quantity of interest data for each sensor location is more similar to the sensor-derived dynamic quantity of interest for the non-filtered sensor 144 or the sensor-derived dynamic quantity of interest for the analog low-pass filtered sensor 148. That is, if the similarity is greater between the DIC-derived dynamic quantity of interest for the non-filtered sensor 144 and the sensor-derived dynamic quantity of interest for the non-filtered sensor 144 than the similarity between the DIC-derived dynamic quantity of interest for the analog low-pass filtered sensor 148 and the sensor-derived dynamic quantity of interest for the analog low-pass filtered sensor 148, aliasing may exist or otherwise may be influencing the DIC-derived dynamic quantity of interest. For example, aliasing may cause the DIC-derived dynamic quantity of interest to be slightly higher than or otherwise offset from the sensor derived dynamic quantity of interest; such offset may result in such a lower similarity. Accordingly, as a result of step S760, an indication as to whether aliasing is or is likely to be present may be generated based on such comparisons at step S764. Such an indication may be rendered to or otherwise presented on a display, such as the user output 216.

In accordance with some embodiments of the present disclosure, a similarity between the DIC-derived dynamic quantity of interest and the sensor-derived dynamic quantity of interest may be range dependent. That is, as illustrated in at least FIG. 12, above and/or below certain ranges, the DIC-derived dynamic quantity of interest may be more or less similar to the sensor-derived dynamic quantity of interest. Accordingly, such ranges of similarity may be further identified. Method 700 may then end at step S768. As a result of method 700 for example, if aliasing is likely to be present, the DIC dynamic quantity of interest may be corrected, tagged, or indicated as potentially erroneous at optionally identified step S768. Alternatively, or in addition, a DIC-derived displacement signal for the component of interest 124 may be generated at step S772. Based on the determination of a wavelet filter type and decomposition level by any of steps S716 to S732 and steps S740 to S756, the DIC-derived displacement signal for the component of interest 124 may be wavelet filtered at step S776. That is, the wavelet filter type and level determined by either of steps S716 to S732 and steps S740 to S756 may be applied to other DIC-derived displacement signals based on the series of images 112. Such DIC-derived displacement signals may be for the component of interest 124 and/or other components within the region of interest 132. Accordingly, dynamic quantities of interest based on the wavelet filtered DIC-derived displacement signal for the component of interest 124 may be generated at step S780. Method 700 may then end at step S784.

Figure 8:
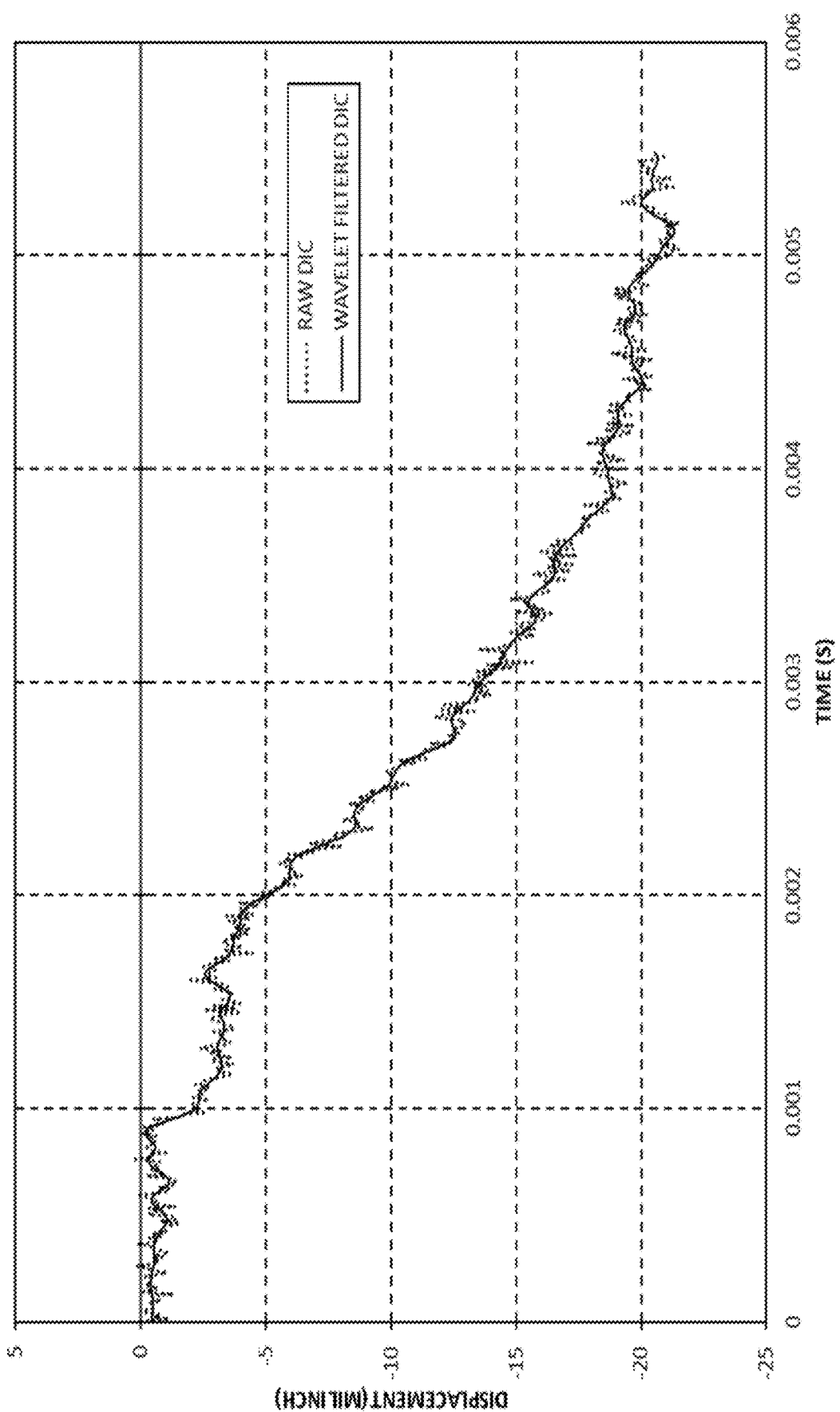
FIG. 8 illustrates a first chart depicting a raw and filtered optically-derived displacement signal over time in accordance with embodiments of the present disclosure.

Referring now to FIG. 8, an example of a DIC-derived displacement signal and the resulting filtered DIC-derived displacement signal in accordance with embodiments of the present disclosure is illustrated. That is, a raw unfiltered digital image correlation signal is illustrated in the time domain; such a signal is the same as or similar to the signal illustrated in FIG. 5. Such a DIC-derived displacement signal may correspond to a displacement signal for the component of interest 124, the non-filtered sensor 144, the analog low-pass filtered sensor 148, another location or component within the region of interest 132, and/or the region of interest 132 itself. Accordingly, as a result of a wavelet filtering process, for example as a result of steps S616, S716, and/or S740, a wavelet filtered DIC displacement signal may be obtained as illustrated by the solid line.

Figure 9:
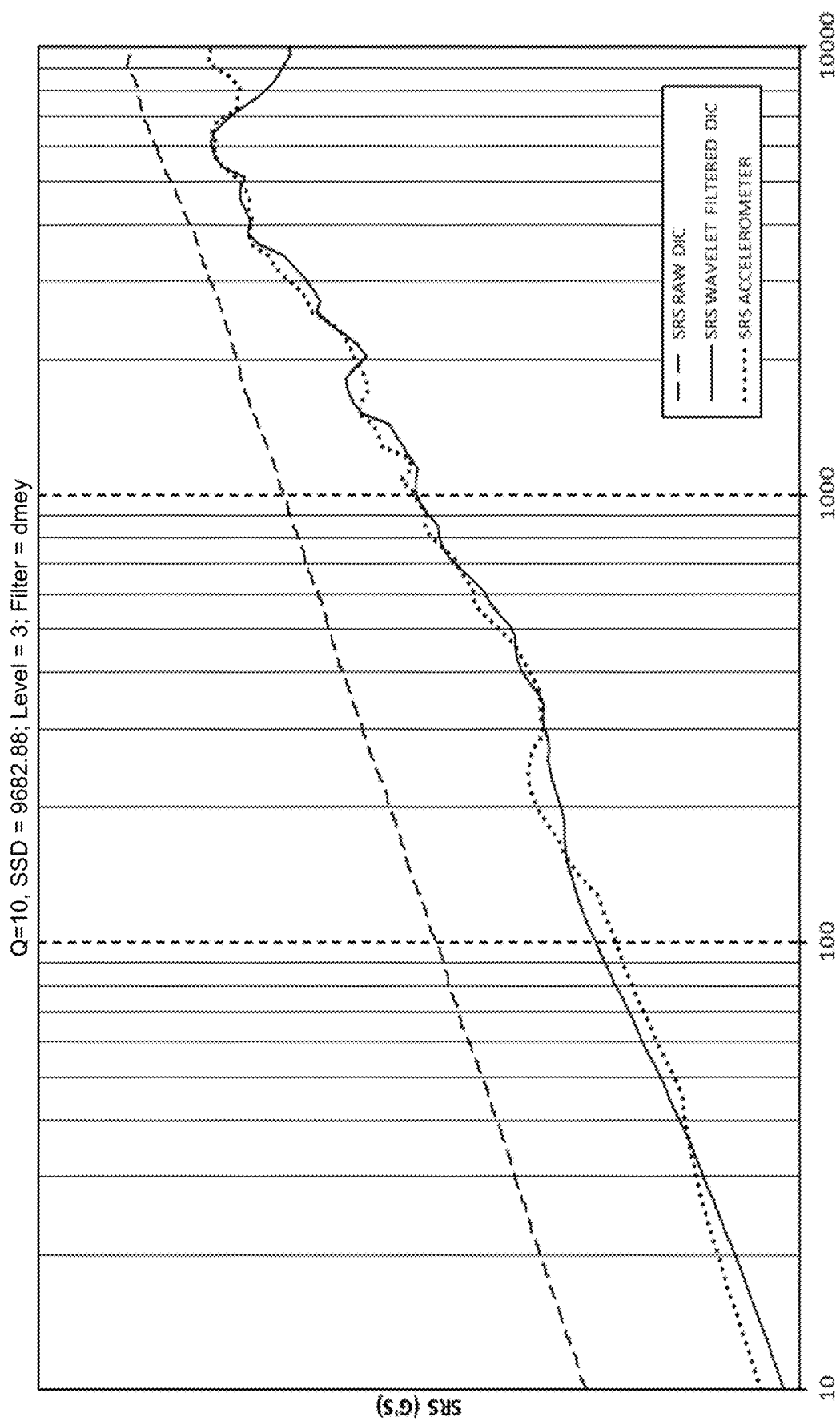
FIG. 9 illustrates a first chart depicting a raw and filtered optically-derived dynamic quantity of interest together with an accelerometer derived dynamic quantity of interest in accordance with embodiments of the present disclosure.

Referring now to FIG. 9, an example of a DIC-derived dynamic quantity of interest is illustrated in accordance with embodiments of the present disclosure. That is, a shock response spectrum is depicted illustrating an SRS dynamic quantity of interest based on the RAW DIC, that is—unfiltered DIC-derived displacement signal. FIG. 9 illustrates a potential problem with generating dynamic quantities of interest based on unfiltered DIC-derived displacement signals. That is, the DIC-derived SRS signal is higher than the sensor-derived SRS signal. Accordingly, as a result of proper filtering, such as wavelet filtering at steps S616, S716, and/or S740, the noise associated with the DIC-derived displacement signal may be reduced or otherwise eliminated. Accordingly, subsequent derivatives of such a signal are not amplifying the noise otherwise removed. Therefore, as illustrated by at least FIG. 9, the SRS signal based on wavelet filtered DIC data more closely matches the sensor-derived SRS signal.

In accordance with some embodiments of the present disclosure, when undertaking some shock-related testing, sensors may exhibit signs of saturation. That is, as illustrated in at least FIG. 10, a bottom accelerometer signal illustrates clear signs of saturation. Saturation generally occurs when a sensor's natural resonant frequency is excited and often results in artificially high spectral content around one or more frequency ranges. Accordingly, the effects of saturation can be removed and corrected utilizing one or more processes, as illustrated by a top accelerometer signal in FIG. 10. However, as such signal is corrected, dynamic quantities of interest derived from the sensor signal may be affected as will be discussed with respect to FIG. 12.

Figure 10:
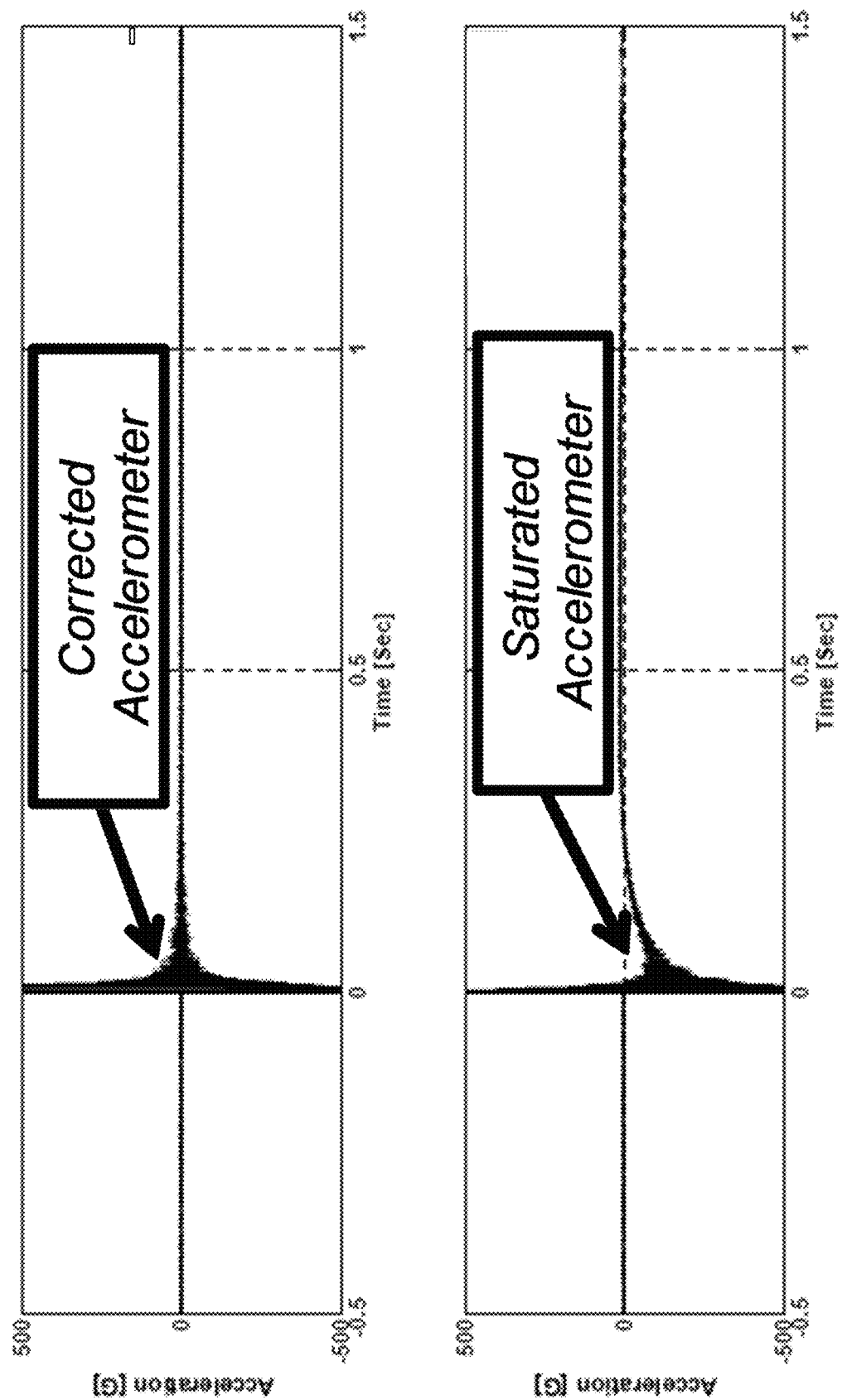
FIG. 10 illustrates a chart depicting saturated and corrected accelerometer data in accordance with embodiments of the present disclosure.
Figure 11:
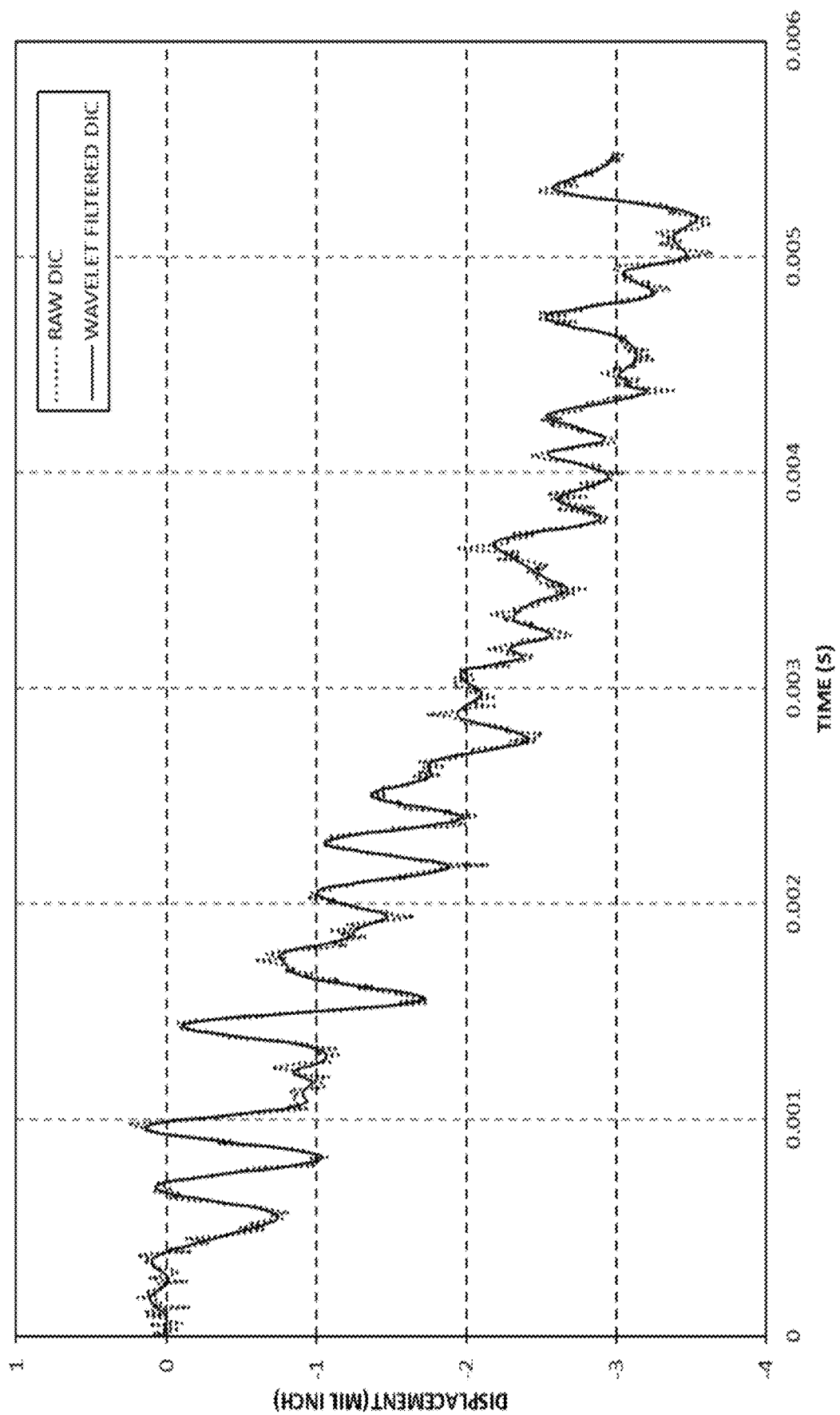
FIG. 11 illustrates a second chart depicting a raw and filtered optically-derived displacement signal over time in accordance with embodiments of the present disclosure.

Referring to FIG. 11, an example of a DIC-derived displacement signal and the resulting filtered DIC-derived displacement signal in accordance with embodiments of the present disclosure is illustrated. That is, a raw unfiltered digital image correlation signal based on the corrected accelerometer saturation signal of FIG. 10 is illustrated in the time domain. Such a DIC-derived displacement signal may correspond to a displacement signal for the component of interest 124, the non-filtered sensor 144, the analog low-pass filtered sensor 148, another location or component within the region of interest 132, and/or the region of interest 132 itself; however, in accordance with embodiments of the present disclosure, the displacement signal is associated with at least one of the non-filtered sensor 144 or analog low-pass filtered sensor 148. As a result of a wavelet filtering process, for example, as a result of steps S616, S716, and/or S740, a wavelet filtered DIC displacement signal may be obtained as illustrated by the solid line.

Figure 12:
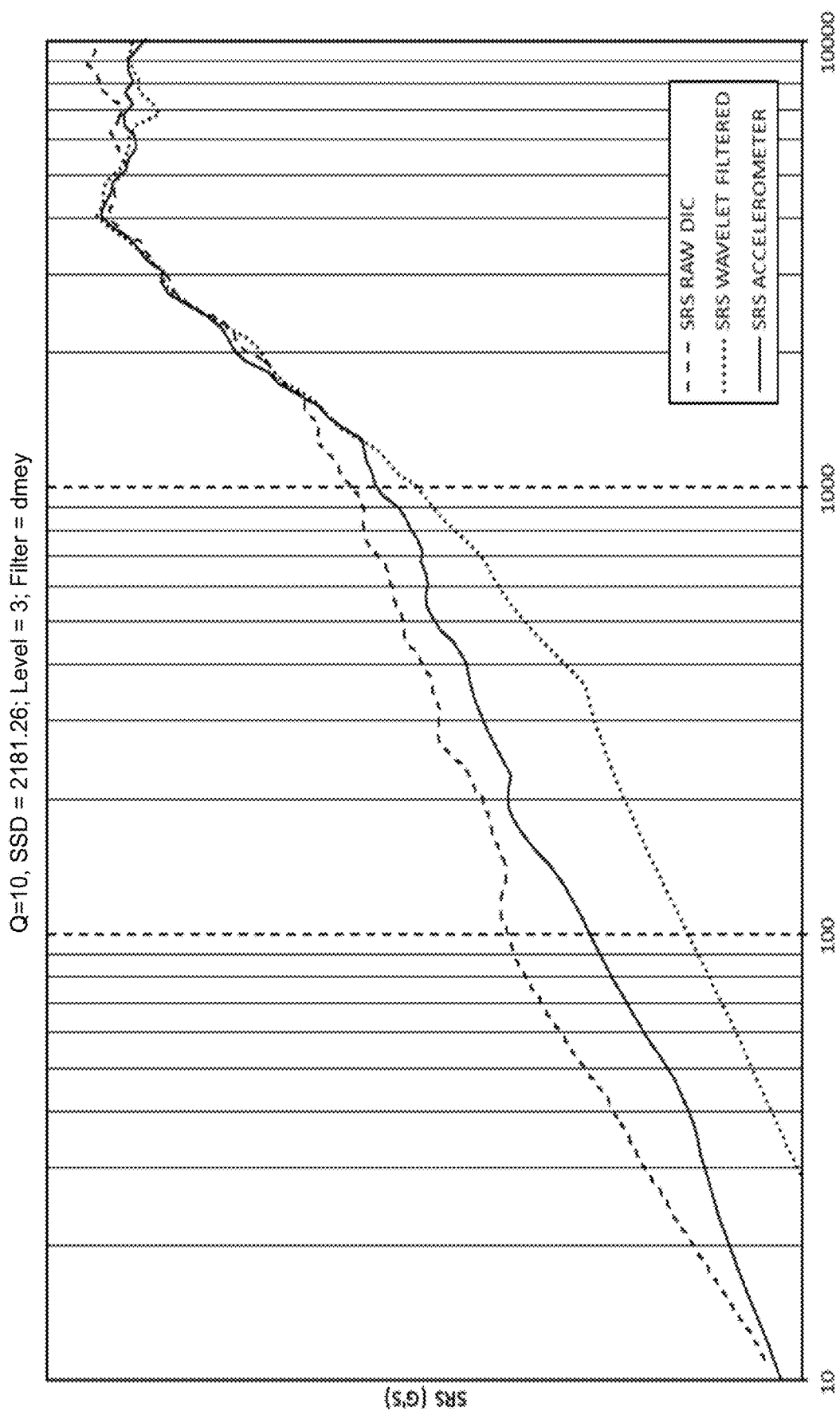
FIG. 12 illustrates a second chart depicting raw and filtered optically-derived dynamic quantity of interest together with an accelerometer derived dynamic quantity of interest in accordance with embodiments of the present disclosure.

Referring now to FIG. 12, an example of a DIC-derived dynamic quantity of interest based on the DIC-derived displacement signal of FIG. 11 is illustrated in accordance with embodiments of the present disclosure. That is, a shock response spectrum is depicted illustrating an SRS dynamic quantity of interest based on the raw unfiltered DIC-derived displacement signal. FIG. 12 illustrates that at certain frequencies, the SRS signal based on the wavelet filtered DIC-derived displacement signal may match, or otherwise be similar to, a SRS signal derived from an accelerometer. Similar to FIG. 9, however, the SRS signal based on raw unfiltered DIC-derived data of FIG. 12 may be higher than an accelerometer-derived SRS signal. As a result of proper filtering, such as wavelet filtering at steps S616, S716, and/or S740, the noise associated with the DIC-derived displacement signal may be reduced or otherwise eliminated and the DIC-derived SRS signal may more accurately represent or otherwise be more similar to the accelerometer-derived SRS signal. However, as in the case of FIG. 12, the accelerometer has been saturated (see. e.g., FIG. 10); therefore, the SRS signal based on a wavelet filtered and DIC-derived displacement signal may not match the accelerometer-derived SRS signal in all frequencies. However, since the SRS signal based on the wavelet filtered DIC-derived displacement signal near matches the accelerometer-derived displacement signal above 1000 Hz, the exclusion of the accelerometer derived SRS signal may be warranted below 1000 Hz. Accordingly, the SRS signal based on the wavelet filtered DIC-derived displacement signal may more accurately represent the accelerometer-derived SRS signal for some frequency ranges.

While the non-filtered sensor 144 and the analog low-pass filtered sensor 148 have been illustrated as not being directly attached to the component of interest 124, in some embodiments, such sensors may be mounted directly to the component of interest 124. In such embodiments, the sensors tend to be of similar size and weight to the component of interest. Further, such an embodiment provides for a more direct source shock measurement, particularly on curved components of interest, or components of interest mounted to a curved surface or object. Accordingly, dynamic quantities of interest may be generated for curved surfaces without adding additional hardware and without further component modifications, such as drilling/tapping the component. Moreover, such embodiments may provide the ability to measure high "G" environments without damaging sensors or modifying the component to ensure test sensors stay in contact with the component or sacrificing low frequency response. Similarly, embodiments in accordance with the present disclosure provide the ability to perform spatial measurements, measure more locations and directions per test, and further measure non-traditional dynamic quantities of interest, such as, but not limited to, strains, surface plasticity, and power.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A system comprising:
   a data acquisition device capturing data associated with a component within at least one region of interest;
   a sensor, wherein the sensor is an accelerometer; and
   a data processing system receiving data associated with the sensor and data captured by the data acquisition device, the data processing system including:
   at least one processor; and
   memory storing one or more program instructions that when executed by the at least one processor, cause the processor to:
   generate a first dynamic quantity of interest for the component within the at least one region of interest, wherein the first dynamic quantity of interest is based on a non-contact type measurement,
   compare the first dynamic quantity of interest for the component to a second dynamic quantity of interest based on the data associated with the sensor, and
   filter data associated with a third dynamic quantity of interest based on a measure of similarity between the first dynamic quantity of interest for the component and the second dynamic quantity of interest based on the data associated with the sensor.

2. The system of claim 1, wherein the at least one region of interest includes the sensor.

3. The system of claim 1, wherein the data acquisition device is configured to capture one or more images and the one or more images include the at least one region of interest.

4. The system of claim 3, wherein the first dynamic quantity of interest for the component is an optically-derived dynamic quantity of interest and is generated from the one or more images using at least one digital image correlation technique.

5. The system of claim 1, wherein the instructions further cause the processor to:
   generate an optically-derived dynamic quantity of interest for a second component within the at least one region of interest; and
   filter data associated with the optically-derived dynamic quantity of interest for the second component.

6. The system of claim 1, wherein the sensor data associated with the sensor is analog low-pass filtered sensor data.

7. A method comprising:
   generating a first dynamic quantity of interest based on a non-contact type measurement for a component within at least one region of interest,
   comparing the first dynamic quantity of interest for the component to a second dynamic quantity of interest based on data associated with a sensor, wherein the sensor is an accelerometer, and
   filtering data associated with at least one dynamic quantity of interest based on a measure of similarity between the first dynamic quantity of interest for the component and the second dynamic quantity of interest based on the data associated with the sensor.

8. The method of claim 7, wherein the at least one region of interest includes the sensor.

9. The method of claim 7, further comprising:
   generating the optically-derived dynamic quantity of interest for the component from one or more images using at least one digital image correlation technique.

10. The method of claim 9, wherein the one or more images include the at least one region of interest.

11. The method of claim 1, further comprising:
    generating an optically-derived dynamic quantity of interest for a second component within the at least one region of interest; and
    filtering data associated with the optically-derived dynamic quantity of interest for the second component based on the measure of similarity between the first dynamic quantity of interest for the component and the second dynamic quantity of interest based on the data associated with the sensor.

12. A method comprising:
    generating a first dynamic quantity of interest based on data associated with a first sensor;
    generating a second dynamic quantity of interest based on data associated with a second sensor;
    generating third dynamic quantity of interest based on a non-contact type measurement for a component within at least one region of interest,
    comparing the first dynamic quantity of interest to the second dynamic quantity of interest, and
    filtering data associated with the third dynamic quantity of interest for the component within the at least one region of interest based on a measure of similarity between the first dynamic quantity of interest and the second dynamic quantity of interest.

13. The method of claim 12, wherein the first sensor is an accelerometer and the second sensor is an accelerometer.

14. The method of claim 12, wherein the at least one region of interest includes the first sensor.

15. The method of claim 12, further comprising:
    generating the third dynamic quantity of interest for the component from one or more images using at least one digital image correlation technique.

16. The method of claim 12, wherein the data associated with the first sensor is analog low-pass filtered data and the data associated with the second sensor is not analog low-pass filtered data.

17. The method of claim 12, further comprising:
    generating an optically-derived dynamic quantity of interest for a second component within the at least one region of interest; and
    filtering data associated with the optically-derived dynamic quantity of interest for the second component based on the measure of similarity between the first dynamic quantity of interest and the second dynamic quantity of interest.

* * * * *